United States Patent
Kumano et al.

(10) Patent No.: US 9,702,779 B2
(45) Date of Patent: Jul. 11, 2017

(54) ENGINE CONTROL DEVICE

(71) Applicant: HItachi Automotive Systems, Ltd., Hitachinaka-shi, Ibaraki (JP)

(72) Inventors: Kengo Kumano, Tokyo (JP); Yoshihiko Akagi, Hitachinaka (JP); Takuya Shiraishi, Tokyo (JP); Kenichiroh Ogata, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 281 days.

(21) Appl. No.: 14/396,508

(22) PCT Filed: Mar. 13, 2013

(86) PCT No.: PCT/JP2013/056897
§ 371 (c)(1),
(2) Date: Oct. 23, 2014

(87) PCT Pub. No.: WO2013/161415
PCT Pub. Date: Oct. 31, 2013

(65) Prior Publication Data
US 2015/0128683 A1    May 14, 2015

(30) Foreign Application Priority Data
Apr. 26, 2012    (JP) .................. 2012-100537

(51) Int. Cl.
*G01M 15/10*    (2006.01)
*G01L 23/22*    (2006.01)
(Continued)

(52) U.S. Cl.
CPC ............ *G01L 23/225* (2013.01); *F02D 13/02* (2013.01); *F02D 35/021* (2013.01);
(Continued)

(58) Field of Classification Search
CPC .............. F02P 17/12; F02P 2017/128; F02P 2017/125; F02D 35/021; F02D 35/027;
(Continued)

(56) References Cited

U.S. PATENT DOCUMENTS 5,241,937 A * 9/1993 Kanehiro ................ F02P 17/12
123/406.27
5,743,233 A * 4/1998 Unland .................. G01L 23/225
123/406.37
(Continued)

FOREIGN PATENT DOCUMENTS

JP    6-323191    11/1994
JP    10-103210    4/1998
(Continued)

OTHER PUBLICATIONS

PCT International Search Report on application PCT/JP2013/056897 mailed May 14, 2013; 4 pages.
(Continued)

*Primary Examiner* — Freddie Kirkland, III
(74) *Attorney, Agent, or Firm* — Foley & Lardner LLP

(57) ABSTRACT

In order to solve a problem that in an internal combustion engine in which abnormal combustion (knocking or an accidental fire) of an engine is detected from an ion signal, the setting of an abnormal combustion determination threshold value under a transient condition in which an engine operating state abruptly changes is difficult to thereby cause erroneous determination, the present invention is an engine control device provided with an ion signal detection means for detecting ions generated during combustion, and provided with an abnormal combustion determination means for determining knocking or an accidental fire according to an ion signal detected by the detection means, the engine control device being characterized by being provided with an in-cylinder temperature estimation means for estimating
(Continued)

the in-cylinder temperature in a normal combustion cycle under a current operating condition of the engine, and by setting the knocking determination threshold value or accidental fire determination threshold value of the ion signal on the basis of the estimated in-cylinder temperature information. Consequently, it becomes possible to accurately detect abnormal combustion even under a transient operating condition.

9 Claims, 17 Drawing Sheets

(51) Int. Cl.
 F02P 17/12 (2006.01)
 F02D 13/02 (2006.01)
 F02D 35/02 (2006.01)
 F02D 37/02 (2006.01)

(52) U.S. Cl.
 CPC ......... F02D 35/026 (2013.01); F02D 35/027 (2013.01); F02P 17/12 (2013.01); G01M 15/102 (2013.01); F02D 35/028 (2013.01); F02D 37/02 (2013.01); F02D 2200/1015 (2013.01); F02P 2017/125 (2013.01); Y02T 10/18 (2013.01)

(58) Field of Classification Search
 CPC ............. F02D 2200/1015; F02D 37/02; F02D 35/026; F02D 35/028; G01L 23/225; G01L 23/22; Y02T 10/18; G01M 15/102
 See application file for complete search history.

(56) References Cited

U.S. PATENT DOCUMENTS

| 5,929,322 | A | * | 7/1999 | Aoki | G01L 23/225 |
| | | | | | 73/35.08 |
| 7,134,423 | B2 | * | 11/2006 | Zhu | F01N 3/2006 |
| | | | | | 123/406.14 |
| 7,673,615 | B2 | * | 3/2010 | Oe | F02D 35/027 |
| | | | | | 123/406.29 |
| 8,977,475 | B2 | * | 3/2015 | Stroh | F02P 5/152 |
| | | | | | 123/406.21 |
| 2002/0007818 | A1 | | 1/2002 | Lodise et al. | |
| 2002/0014108 | A1 | | 2/2002 | Hohner et al. | |
| 2004/0084018 | A1 | | 5/2004 | Zhu et al. | |
| 2004/0089056 | A1 | | 5/2004 | Tanaya | |
| 2006/0042355 | A1 | | 3/2006 | Zhu et al. | |
| 2009/0050108 | A1 | | 2/2009 | Asano et al. | |
| 2011/0093186 | A1 | | 4/2011 | Hagari et al. | |

FOREIGN PATENT DOCUMENTS

| JP | P2000-130246 A | 5/2000 |
| JP | 2003-184635 A | 7/2003 |
| JP | 2003-184725 A | 7/2003 |
| JP | 2008-101591 A | 5/2008 |

OTHER PUBLICATIONS

Ahmedi, A., Prediction Tool for the Ion Current in Si Combustion, Powertrain & Fluid Systems Conference & Exhibition, Pittsburgh, PA; Oct. 27-30, 2003, pp. 1-7.
European Patent Office extended search report on application 13781570.0 dated Dec. 22, 2015; 1 pages.

* cited by examiner

ENGINE CONTROL DEVICE

TECHNICAL FIELD

The present invention relates to an engine control device and, more particularly, to an abnormal combustion detector using an ion signal.

BACKGROUND ART

Attempts have recently been made to improve the combustion efficiency of an engine in order to enhance the fuel efficiency of an automobile. One of the technologies for the improvement of combustion efficiency is an increase in compression ratio. It has already been theoretically certified that an increase in compression ratio leads to an improvement in the heat efficiency of an internal combustion engine. The compression ratio of a gasoline engine is set to a value of about 10, and the compression ratio of a diesel engine is set to a value of about 18. Thus, the diesel engine exhibits higher heat efficiency. With an increase in compression ratio, the gasoline engine becomes more likely to cause abnormal combustion called knocking. Therefore, the increase in compression ratio has a limit.

A technique of re-circulating an exhaust gas (hereinafter referred to as an "Exhaust Gas Recirculation gas" or "EGR gas") to an intake and re-introducing the gas into a combustion chamber to combust the gas has already been proposed as a technology for preventing the occurrence of knocking. The technique aims at taking in many inert ingredients contained in the EGR gas, such as $CO_2$ and $N_2$, to increase amounts of working mixture which does not contribute to combustion. As a result, a burning reaction becomes slow, which reduces a combustion rate. The technique can prevent the occurrence of knocking even in the engine having a high compression ratio and allows an increase in compression ratio to a value of about 14. Moreover, this technique is applicable also to a high supercharger engine.

On the other hand, the technique for re-introducing and burning the EGR gas has been reported as follows. If the EGR gas is taken in more than a determined amount, combustion failures, such as misfiring and unburning, will occur for reasons of deterioration of ignitability, a decrease in combustion rate, and the like, which will also make variations in combustion greater.

Therefore, in order to increase the compression ratio of the engine by utilization of the EGR gas, it is necessary to detect knocking, or abnormal combustion, and misfiring which induces variations in combustion. As one of means for detecting the abnormal combustion, such as knocking and misfiring, a method for detecting ions generated during combustion as an ion signal is effective. A value of ion signal significantly changes according to operating conditions of the engine (an engine torque, an engine speed, etc.). For this reason, an ion signal value (a threshold value for determination) for determining the abnormal combustion needs to be changed according to the operating conditions. To this end, a mean value of ion signals for several cycles in the past is taken as a background level. A threshold value for determination is computed from the background level. However, when a change occurred in a load of the engine or the engine speed, such a method brings about a problem of a given lag occurring in the changes of the threshold value for determination.

Technology described in connection with Patent Literature 1 has been known as a technique such as that an ion current value (background) acquired during normal combustion is stored on an engine operation map made up of axes representing engine load and engine speed, a threshold value for determining knocking is set on the basis of the value, and an update is made to the threshold value for determination in each operation range by means of learning.

CITATION LIST

Patent Literature

PATENT LITERATURE JP-A-2000-130246

SUMMARY OF INVENTION

Technical Problem

However, in a situation where a sudden change occurs in torque as a result of; for instance, a driver forcefully stepping down an accelerator pedal, etc., a cylinder status (gas composition and temperature) may transiently deviate from conditions for steady operation determined by the axis of engine load and the axis of engine speed. In particular, in a system that introduces a large amount of EGR gas, such as that mentioned above, when an abrupt change occurs in a control target value of the EGR rate along with a change in torque, there occurs a phenomenon of an actual value of the EGR rate causing an overshoot or an undershoot with respect to the target value. As a result, a cylinder status (gas composition and gas temperature) may change to a state which could not occur under steady conditions. If the threshold value for determining the abnormal combustion set on the basis of the steady condition map determined by the axis of engine load and the axis of engine speed is used in such a case, there will arise a problem of normal combustion being erroneously determined as abnormal combustion (knocking or misfiring) or abnormal combustion (knocking or misfiring) being erroneously determined as normal combustion.

In light of the problem, an objective of the present invention is to provide an engine control device capable of determining the occurrence of knocking and misfiring accurately even under any operating conditions, including transient conditions in which an abrupt change occurs, etc., in cylinder status.

Solution to Problem

In order to achieve the objective, an engine control device of the present invention includes an ion signal detection means for detecting ions generated during combustion and an abnormal combustion determination means for determining an occurrence of knocking or misfiring by means of an ion signal detected by the detection means, and the engine control device further includes an in-cylinder temperature estimation means for estimating an in-cylinder temperature in a normal combustion cycle under current operating conditions of the engine, wherein a knocking determination threshold value or a misfiring determination threshold value of the ion signal is set on the basis of estimated in-cylinder temperature information.

By means of the configuration, the in-cylinder temperature information having correlation with an ion signal value is estimated in each cycle. A determination threshold value is set on the basis of the temperature information. Thus, the occurrence of an erroneous determination is prevented under any operating conditions, so that accuracy of the detection of abnormal combustion can be enhanced.

In another aspect of the engine control device of the present invention, the in-cylinder temperature estimation means estimates the in-cylinder temperature by use of at least one of internal pressure of an intake pipe of the engine, opening-closing timings of an intake valve and an exhaust valve that control the air intake and the air exhaust of the engine, an air-fuel ratio that is a mass ratio of air to fuel fed to the interior of a combustion chamber of the engine, and an ignition signal for controlling the ignition timing of the engine.

By means of this configuration, a more accurate in-cylinder temperature can be estimated at the time of the estimation of the in-cylinder temperature by considering engine control parameters that directly affect the in-cylinder temperature, such as the intake valve, the exhaust valve, the air-fuel ratio, and the ignition timing.

Moreover, in another aspect of the engine control device of the present invention, the abnormal combustion determination means determines knocking or misfiring from an integration of the ion signal acquired in a predetermined period of a combustion cycle or a peak value of the ion signal acquired in a predetermined period.

By means of this configuration, both knocking and misfiring can be determined by subjecting the ion signal to the same processing, and hence a load on the computation of an ECU can be reduced.

Still more, in another aspect of the engine control device of the present invention, when the abnormal combustion determination means determines an occurrence of knocking or misfiring, at least one of the ignition timing of the engine and the closing timing of the intake valve is changed.

By means of this configuration, immediately after abnormal combustion is determined, the engine parameters can be controlled so as to prevent the abnormal combustion. Thus, the occurrence of abnormal combustion can be minimized.

Still further in another aspect of the engine control device of the present invention, the engine control device further includes an steady state operation determination means for determining whether or not a current operation state of the engine is the steady operation state, wherein a knocking determination threshold value or a misfiring determination threshold value of the ion signal is set on the basis of the in-cylinder temperature information when the steady state operation determination means determines that the current operation state of the engine is not the steady operation state.

By means of this configuration, determination of abnormal combustion based on the estimated in-cylinder temperature information is made only on the basis of conditions determined not to be steady state conditions; in other words, transient conditions in which the behavior of gas in the cylinder is significantly changing. Therefore, an increase in the load on the computation of the ECU entailed by the estimation of the in-cylinder temperature can be minimized.

Advantageous Effects of Invention

According to the present invention, even in transient conditions in which the interior state of the cylinder abruptly changes, knocking or misfiring can be determined with high accuracy by setting an abnormal combustion determination threshold value for an ion current on the basis of the estimated in-cylinder temperature information. Thus, abnormal combustion can be minimized.

DESCRIPTION OF EMBODIMENTS

By reference to FIGS. 1 to 10, a structure and operation of an engine control device according to a first embodiment of the present invention are hereunder described.

Figure 1:
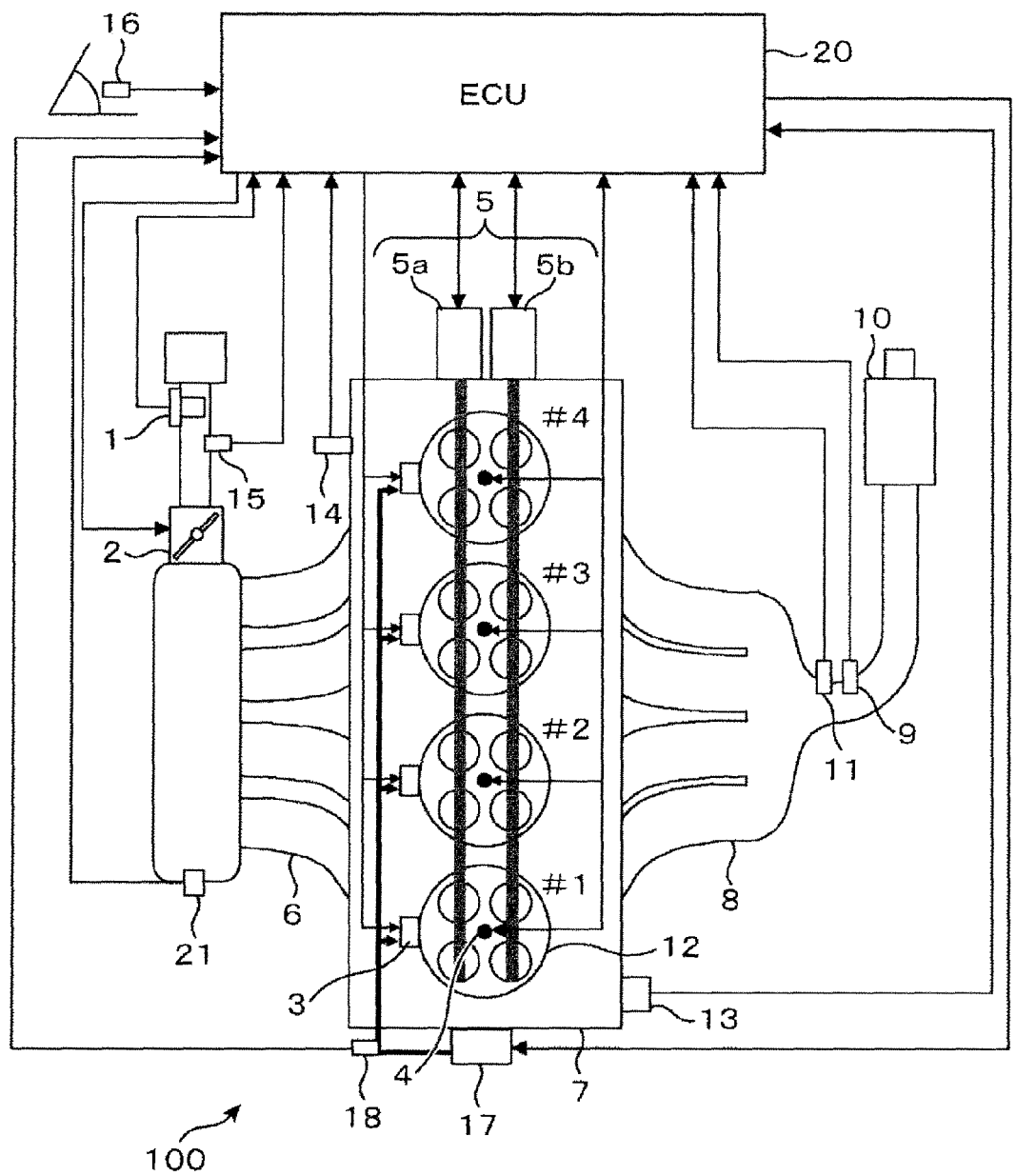
FIG. 1 A system configuration diagram of an engine control device according to a first embodiment of the present invention.

FIG. 1 is a system configuration diagram showing the structure of a system in which the engine control device according to the first embodiment of the present invention is applied to an automobile in-cylinder injection-type gasoline engine.

An engine 100 is an automobile four-cylinder gasoline engine that performs spark-ignition combustion. Disposed at respective arbitrary positions on an intake pipe 6 are an air-flow sensor 1 for measuring an amount of intake air, an electronic control throttle 2 for regulating intake pipe pressure, an intake temperature sensor 15 that is an aspect of an intake air temperature sensor and that measures a temperature of intake air, and an intake pressure sensor 21 for measuring the intake pipe pressure. In the engine 100, a fuel injector (hereinafter referred to as an injector 3) for injecting fuel into a combustion chamber 12 of each cylinder and an ignition system 4 for feeding ignition energy are provided for each cylinder. A coolant temperature sensor 14 for measuring a temperature of engine coolant is provided at an arbitrary position on a cylinder head 7. Further, a variable valve 5 including a variable intake valve 5a for regulating an intake gas flowing into the cylinder and a variable exhaust valve 5b for regulating an exhaust gas emitted from the cylinder is disposed at an arbitrary position on the cylinder head 7. A quantity of air intake and an amount of EGR in all cylinders from 1 through 4 are regulated by controlling the variable valve 5. A high-pressure fuel pump 17 for feeding high-pressure fuel to the injector 3 is connected to the injector 3 by means of a fuel pipe. A fuel pressure sensor 18 for measuring fuel injection pressure is disposed at a position on the fuel pipe.

Disposed at respective arbitrary positions on an exhaust pipe 8 are a three-way catalyst 10 for purifying an exhaust gas, an air-fuel ratio sensor 9 that is an aspect of an air-fuel ratio detector and that detects an air-fuel ratio of the exhaust located at an upstream position with respect to the three-way catalyst 10, and an exhaust temperature sensor 11 that is an aspect of an exhaust temperature detector and that is placed at an upstream position with respect to the three-way catalyst 10 and that measures a temperature of the exhaust. Moreover, a crankshaft is equipped with a crank angle sensor 13 for computing a rotation angle.

Signals delivered from the air-flow sensor 1, the air-fuel ratio sensor 9, the coolant temperature sensor 14, the intake temperature sensor 15, the exhaust temperature sensor 11, crank angle sensor 13, the fuel pressure sensor 18, the intake pressure sensor 21, the ignition system (ion signal detector circuit) 4, and the variable valve 5 (a phase-angle sensor) are sent to an engine control unit (ECU) 20. Moreover, a signal obtained from an accelerator opening sensor 16 is sent to the ECU 20. The accelerator opening sensor 16 detects an extent to which the accelerator pedal is stepped down; in other words, a degree of opening of the accelerator. The ECU 20 computes required torque from a signal output from the accelerator opening sensor 16. Specifically, the accelerator opening sensor 16 is used as a required torque detection sensor which detects the torque required by the engine.

Moreover, the ECU 20 computes engine speed from a signal output from the crank angle sensor 13. The ECU 20 optimally computes principal amounts of operation of the engine, such as an air flow rate, fuel injection amount ignition timing, and fuel pressure, from an operational status of the engine obtained from the outputs of the above-mentioned various sensors.

The fuel injection amount computed by the ECU 20 is converted into a valve-opening pulse signal and sent to the injector 3. An ignition signal 4h is also sent to the ignition system 4 such that ignition is effected at the ignition timing computed by the ECU 20. A throttle opening computed by the ECU 20 is sent to the electronic control throttle 2 as a throttle drive signal. Moreover, an amount of operation of the variable valve computed by the ECU 20 is sent as a variable valve drive signal to the variable valve 5. The fuel pressure computed by the ECU 20 is sent as a high-pressure fuel pump drive signal to the high-pressure fuel pump 17.

Fuel is injected to the air flowed from the intake pipe 6 into the combustion chamber 12 by way of an intake valve, thereby generating an air-fuel mixture. The air-fuel mixture is exploded by sparks generated from an ignition plug 4a at predetermined ignition timing, and the pistons are pushed down by combustion pressure resultant of the explosion, thereby generating engine driving force. Furthermore, the exhaust gas generated after explosion is delivered to the three-way catalyst 10 through the exhaust pipe 8, and exhaust gas components are purified within the three-way catalyst 10 and are discharged outside.

Figure 2:
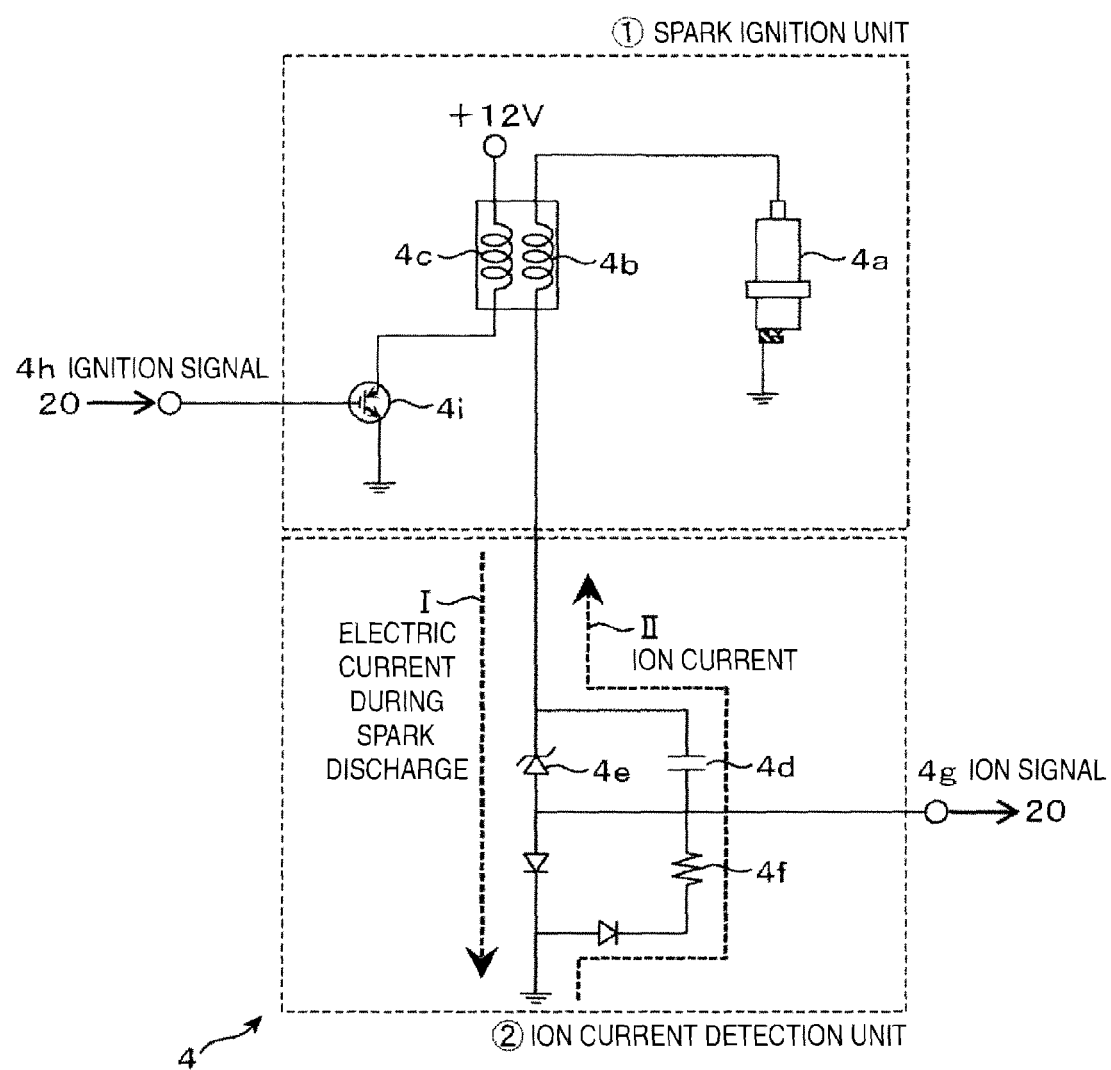
FIG. 2 A configuration diagram of an ignition system of the engine control device according to the first embodiment of the present invention.

FIG. 2 is a drawing showing the structure of the ignition system 4 of the engine control device according to the first embodiment of the present invention. When the ignition signal from the ECU 20 is input, an electric current flows into a primary ignition coil 4c by way of an igniter 4i. When the primary electric current is shut off as a result of the ignition signal being switched to an OFF state, electromotive force develops in a secondary ignition coil 4b, and a high voltage is applied to a leading end of the ignition plug 4a, whereupon a spark discharge arises. During the spark discharge, an electric current flows in a direction of arrow I in the drawing. When the voltage of the secondary ignition coil 4b decreases to a level which is lower than a breakdown voltage (e.g., 100 V) of a Zener diode 4e, the electric current flows into a capacitor 4d, whereby the capacitor 4d is charged with electric charges.

The spark discharge induces a flame kernel in a gap between the ignition plugs, and a flame subsequently spreads in the combustion chamber. Ions, such as chemical ions and thermal ions, exist in a flame band as an intermediate product of a combustion process. At this time, a voltage (in this case, 100 V) is applied to the ignition plug 4a by the capacitor 4d charged at the time of a spark discharge and an ion current flows into a circuit by catching the positive ion (and electron) in the combustion chamber with that voltage (the direction of II in the drawing). After being converted into a voltage by a voltage conversion resistor 4f, the ion current is sent as an ion signal 4g to the ECU 20.

Figure 3:
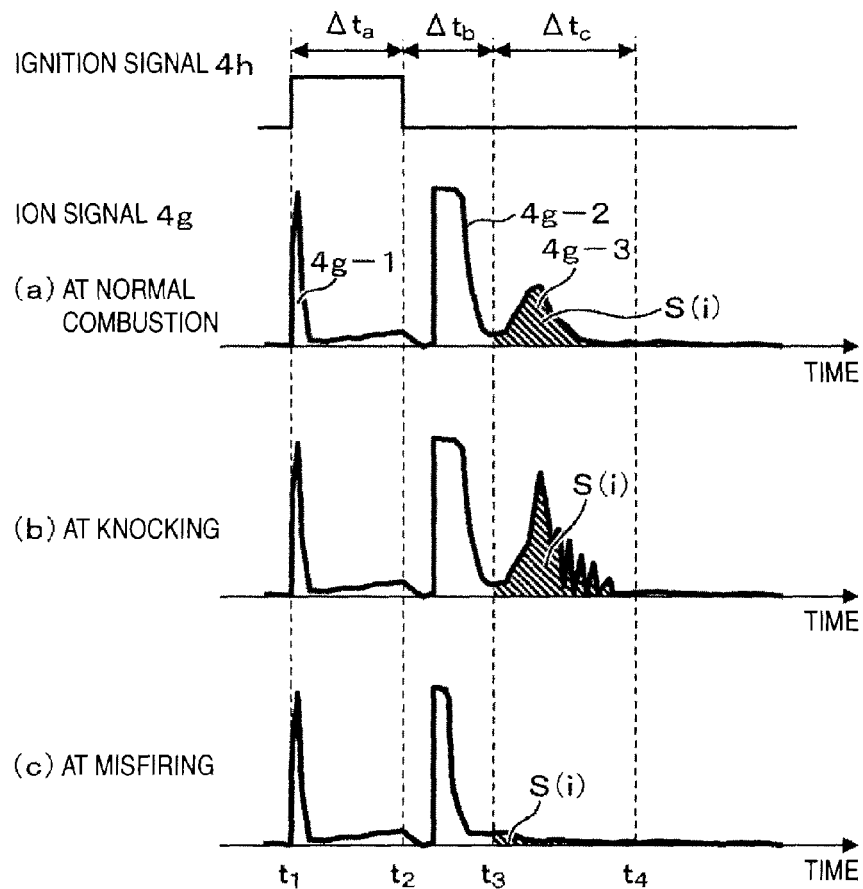
FIG. 3 A typical example of an ignition signal and ion signals of the engine control device according to the first embodiment of the present invention.

FIG. 3 is a typical example of an ignition signal and ion signals of the engine control device according to the first embodiment of the present invention. Illustrated are examples of an ion signals for normal combustion, an ion signal for knocking, and an ion signal for misfiring. The on signal is characterized by three peaks. A first peak 4g-1 is a waveform observed when an ion signal detection circuit is incorporated in the ignition system 4. When the ignition signal 4h is input at time t1, an electric current flows into the ion signal detection unit, where the electric current is output as an ion signal. In reality, combustion flames do not exist in the combustion chamber at this timing; hence, the peak is processed as noise. A second peak 4g-2 is a waveform that is observed when the ignition signal 4h is shut off at time t2 after a lapse of a charge time Δta and when sparks are discharged in the gap of the ignition plug 4a. The ion signal cannot be detected in the middle of sparks being emitting in the gap. However, ion components in flames are detected in an initial phase of combustion. A third peak 4g-3 is a waveform detected in the course of combustion flames spreading over the entirety of the combustion chamber. The peak well coincides with a pressure waveform in the combustion chamber thereby detecting ion components in the flames of the principal combustion area.

Abnormal combustion, such as knocking and misfiring, chiefly appears in the third peak. During knocking, the occurrence of knocking entails an increase in the pressure/ temperature in the combustion chamber. A signal of the third peak accordingly increases, and vibration components having a knocking frequency are superimposed on the signal. During misfiring, ion components are not generated in the flames, and hence the signal of the third peak significantly decreases. In consideration of the characteristics above, the integration of the signal of the third peak is used for determining the occurrence of abnormal combustion in the present embodiment. Specifically, the ignition signal 4h is shut off at time t2, and the ion signal 4g is integrated in a period from time t3 after a lapse of Δtb since the signal was shut off until time t4 after a lapse of Δtc from t3. The integration is taken as S(i).

Figure 4:
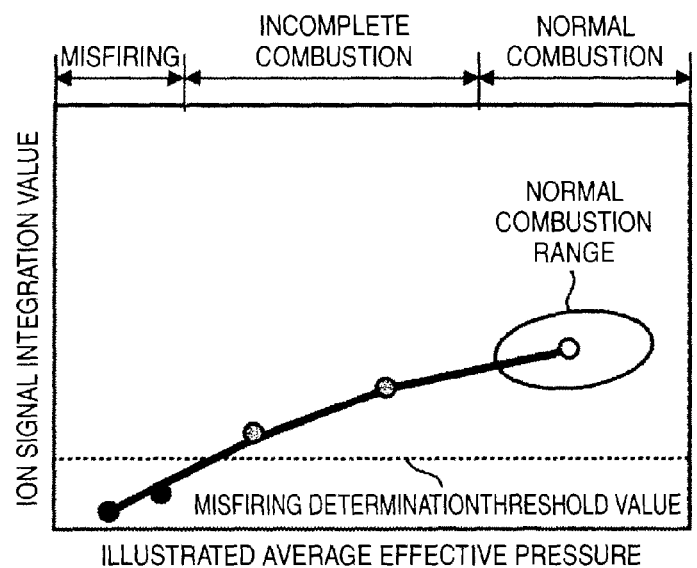
FIG. 4 An explanatory view of a principle of detection of misfiring under a method for determining abnormal combustion of the engine control device according to the first embodiment of the present invention.

FIG. 4 is an explanatory view of a principle of the detection of misfiring by a method for determining abnormal combustion in the engine control device according to the first embodiment of the present invention. The horizontal axis of the graph represents illustrated average effective pressure; in other words, engine torque, whereas the vertical axis represents an ion signal integration value. When the state of combustion is stable, the integration value falls within the range of normal combustion in the drawing. When incomplete combustion or misfiring occurs in such a state, the ion signal integration value S(i) becomes smaller because combustion flames do not exist. When the integration value becomes equal to or smaller than a preset misfiring determination threshold value, the state can be determined to be misfiring. The solid marks plotted in the drawing are in the condition determined to be the occurrence of misfiring. As mentioned above, since the ion signal issued during normal combustion undergoes changes according to operating conditions, such as engine speed, the misfiring determination threshold value must be changed according to the operating conditions.

Figure 5:
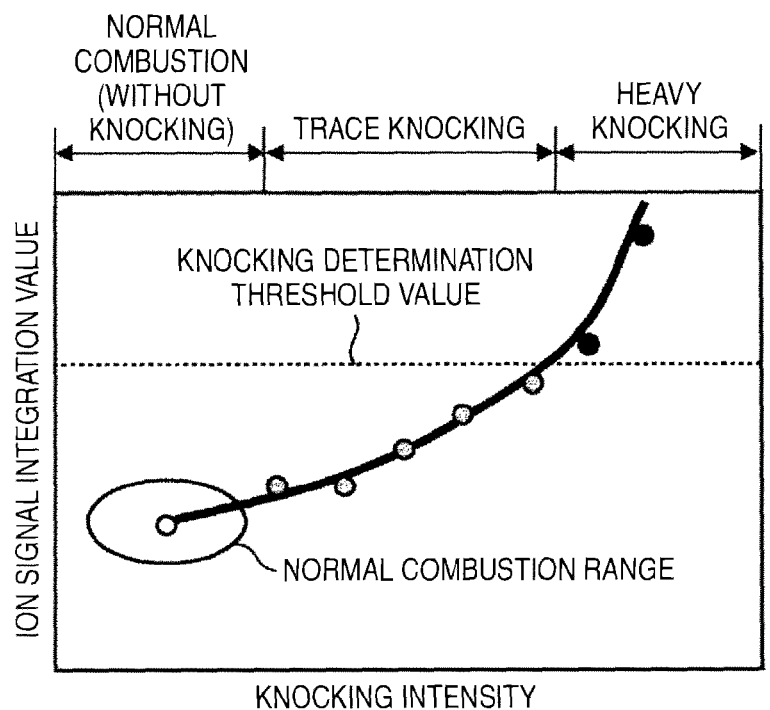
FIG. 5 An explanatory view of a principle of detection of knocking under the method for determining the abnormal combustion of the engine control device according to the first embodiment of the present invention.

FIG. 5 is an explanatory view of a principle of detection of knocking by the method for determining abnormal combustion in the engine control device according to the first embodiment of the present invention. The horizontal axis of the graph represents knocking intensity. The knocking intensity is, for instance, a value of vibration intensity of a knocking frequency component computed from a signal output from the knocking sensor. The vertical axis represents an ion signal integration value. The knocking intensity becomes greater farther toward the left, and the leftmost part shows a state of heavy knocking. When knocking does not occur, the ion signal integration value falls within the range of normal combustion in the drawing. The occurrence of knocking entails an increase in pressure/temperature in the combustion chamber, so that the ion signal integration value S(i) becomes larger. When the ion signal integration value becomes equal to or larger than the preset knocking determination threshold value, the state can be determined to be knocking. The solid marks plotted in the drawing are in the condition determined to be the occurrence of knocking. As mentioned above, the ion signal acquired during normal combustion undergoes changes according to the operating conditions, such as engine speed, so that the knocking determination threshold value must also be changed according to the operating conditions.

Figure 6:
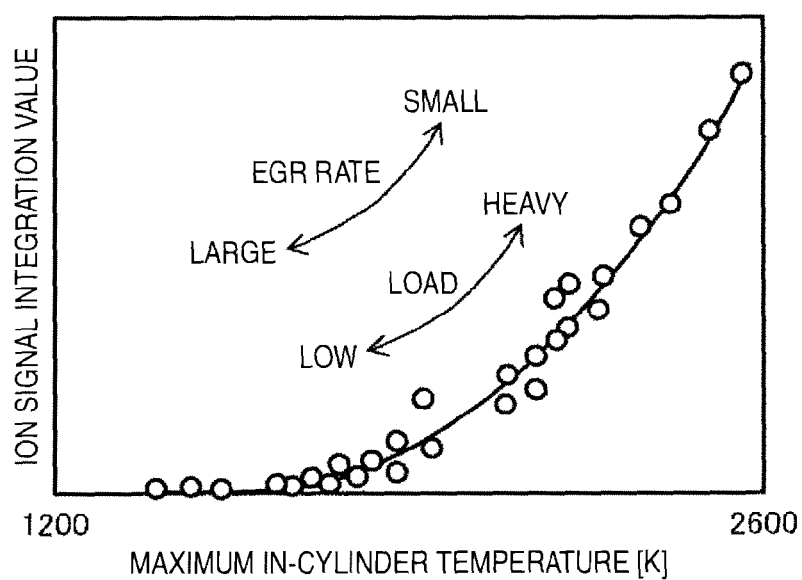
FIG. 6 A relationship between the integration value of the ion signals and the maximum in-cylinder temperature of the engine control device according to the first embodiment of the present invention.

FIG. 6 shows a relationship between the integration of ion signal and maximum in-cylinder temperatures. Plotted are results acquired by changing various parameters, such as engine load, engine speed, air-fuel ratio, and EGR rate. The drawing shows that a strong correlation exists between the ion signal and the maximum in-cylinder temperature and that the ion signal becomes greater as the maximum in-cylinder temperature increases. For instance, the maximum in-cylinder temperature increases under conditions of heavy engine load, so that the ion signal integration value also increases. Further, since the thermal capacity of a cylinder gas increases at large EGR rates, the maximum in-cylinder temperature decreases so that the ion signal integration value also decreases. The principle of the detection of misfiring and knocking shown in FIGS. 4 and 5 also utilizes the relationship between the maximum in-cylinder temperature and the ion signal. As mentioned above, when abnormal combustion is determined from the ion signal, an appropriate determination threshold value must be set according to operating conditions available at that time. Accordingly, the engine control device of the present embodiment predicts the maximum in-cylinder temperature achieved during normal combustion of a target cycle and computes an ion signal for normal combustion by use of the relationship shown in FIG. 6. Subsequently, an abnormal combustion determination threshold value is computed from the ion signal acquired during normal combustion. For instance, a value determined by multiplying the signal acquired during normal combustion by a constant is taken as the abnormal combustion determination threshold value.

Figure 7:
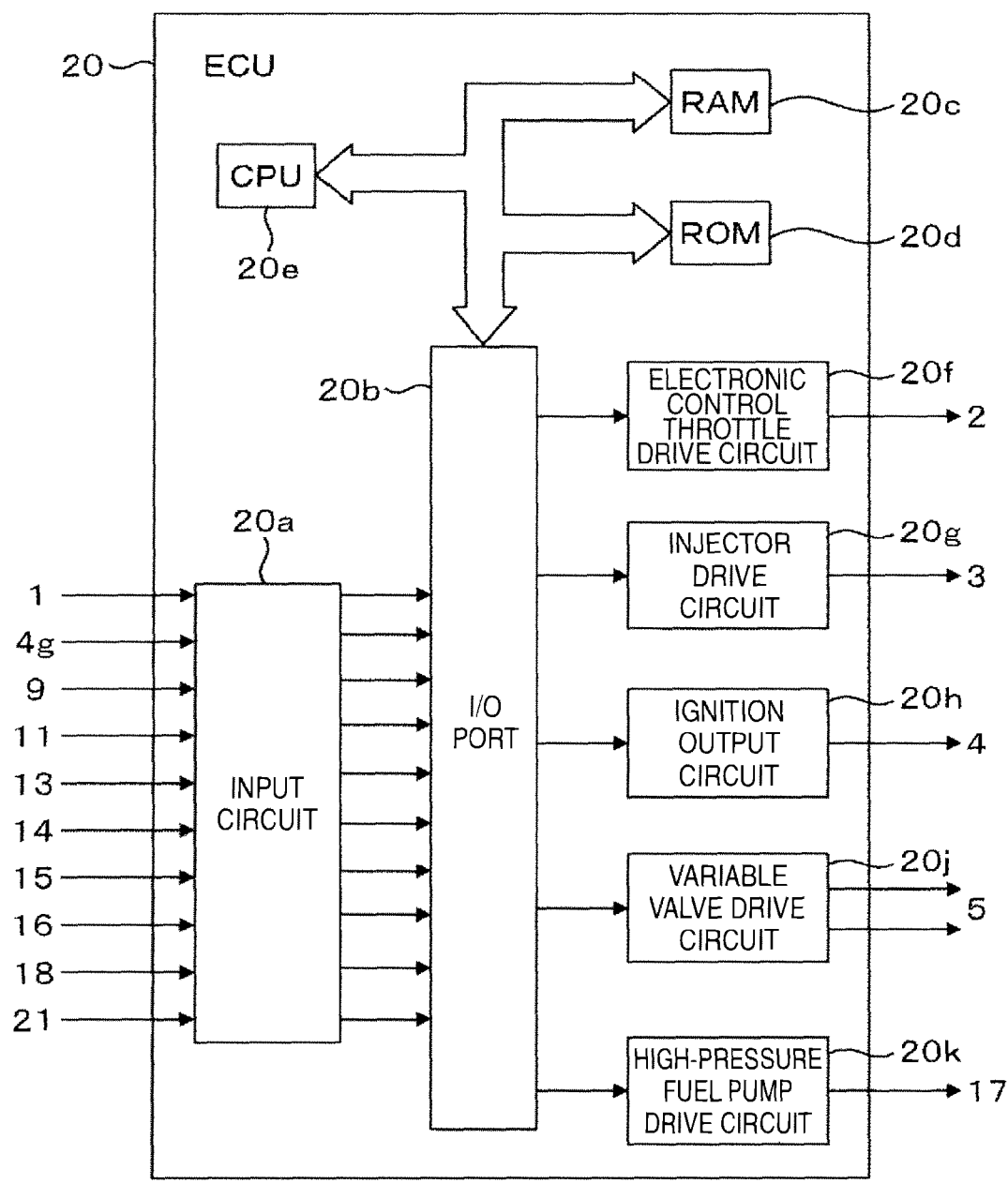
FIG. 7 A system block diagram showing a configuration of the engine control device according to the first embodiment of the present invention.

FIG. 7 is a system block diagram showing a configuration of the engine control device according to the first embodiment of the present invention. Signals output from the air-flow sensor 1, the air-fuel ratio sensor 9, the exhaust temperature sensor 11, the crank angle sensor 13, the coolant temperature sensor 14, the intake temperature sensor 15, the accelerator opening sensor 16, the fuel pressure sensor 18, and the intake pressure sensor 21 as well as the ion signal 4g are input to an input circuit 20a of the ECU 20. However, the input signals are not restricted only to them. The input signals from the sensors are delivered to input ports in an I/O port 20b. Values sent to the I/O port 20b are stored in RAM 20c, and a CPU 20e performs arithmetic computation. A control program describing specifics of arithmetic operation is previously written in ROM 20d.

Values representing amounts of operation of respective actuators computed according to the control program are stored in the RAM 20c. Subsequently, the values are sent to an output port in the I/O port 20b and further delivered to the respective actuators by way of respective drive circuits. In the present embodiment, the drive circuits include an electronic control throttle drive circuit 20f, an injector drive circuit 20g, an ignition output circuit 20h, a variable valve drive circuit 20j, and a high-pressure fuel pump drive circuit 20k. The respective circuits control the electronic control throttle 2, the injector 3, the ignition system 4, the variable valve 5, and the high-pressure fuel pump 17. In the present embodiment, the drive circuits are provided in the EC 20.

However, the configuration of the drive circuits is not limited to that mentioned above. Any of the drive circuits may also be provided in the ECU 20.

The ECU 20 determines the occurrence of abnormal combustion from an input signal. When combustion is determined to be abnormal combustion, the ECU 20 controls the ignition timing and the variable valve.

Figure 8:
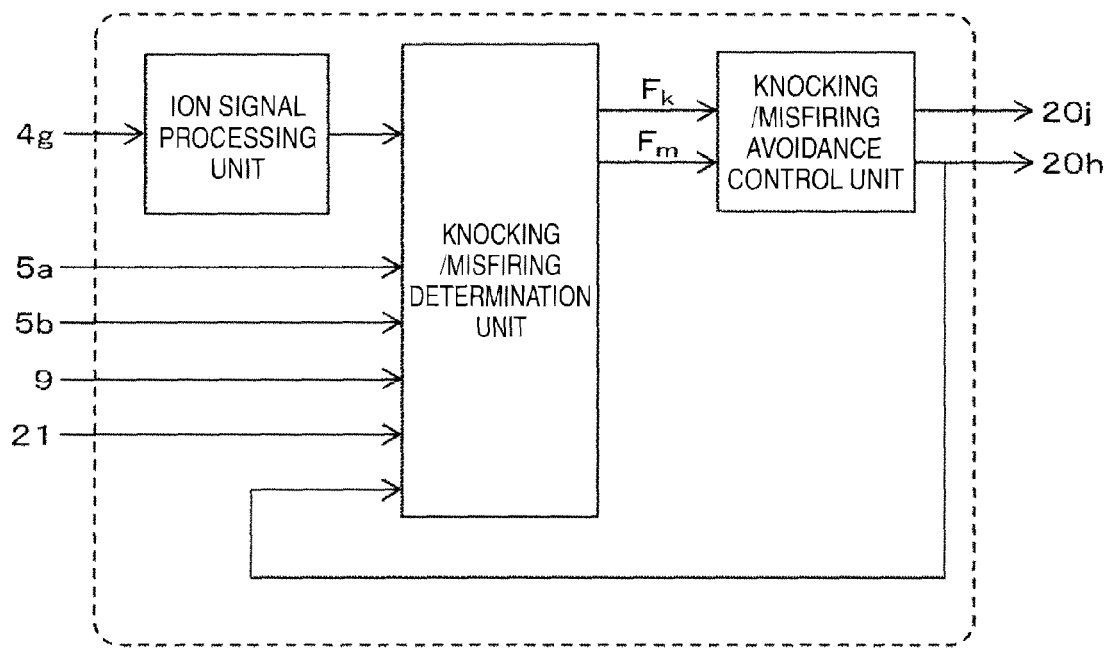
FIG. 8 A schematic diagram of abnormal-combustion determination and avoidance control logic implemented in an ECU of the engine control device according to the first embodiment of the present invention.

FIG. 8 is a drawing showing an outline of a logic for abnormal combustion determination and avoidance control implemented in the ECU 20 of the engine control device according to the first embodiment of the present invention. The logic is made up of an ion signal processing unit, a knocking/misfiring determination unit, and a knocking/misfiring avoidance control unit. The ion signal 4g is input to the ion signal processing unit and subjected to integration in a preset period as illustrated in FIG. 3. In addition to the integration of the ion signal, a current valve phase (especially, intake valve closing timing, exhaust valve closing timing) from the variable valve 5, an air-fuel ratio, intake pipe pressure, an ignition signal (ignition timing) are input to the knocking/misfiring determination unit. Here, the maximum in-cylinder temperature in normal combustion is estimated from the intake valve closing timing, the exhaust valve closing timing, the air-fuel ratio, the intake pipe pressure, and the ignition timing. Specifically, the quantity of air in the cylinder and an amount of internal EGR are determined from the exhaust valve closing timing and the intake pipe pressure. A history of in-cylinder temperatures in an air cycle of a compression-expansion stroke is determined from an effective compression ratio determined from the intake valve closing timing, the quantity of air in the cylinder, and the amount of internal EGR. The maximum in-cylinder temperature in normal combustion can be estimated from the history of in-cylinder temperatures in the air cycle, the amount of heat generated during combustion that is determined from the air-fuel ratio, and the combustion completion timing which can be estimated from ignition timing. Integration of the ion signal achieved during normal combustion is computed from the estimated maximum in-cylinder temperature in normal combustion by use of the relationship shown in FIG. 6. The threshold values for determining knocking and misfiring are determined by multiplying the integration value by a constant. The threshold values for determining knocking and misfiring are compared with the input ion integration value, thereby determining knocking and misfiring. When the occurrence of knocking is determined, a knocking determination flag $F_k$ is set to "1". In contrast, when the occurrence of misfiring is determined, a misfiring determination flag $F_m$ is set to "1". The thus-determined flags are output to the knocking/misfiring avoidance control unit.

The knocking determination flag $F_k$ and the misfiring determination flag $F_m$ are input to the knocking/misfiring avoidance control unit. When $F_k=1$ is input, a command value is input to the ignition output circuit 20h and the variable valve drive circuit 20j in order to retard the ignition timing and the intake valve closing timing (or reduce the effective compression ratio) in order to avoid knocking. Further, when $F_m=1$ is input, another command value is input to the ignition output circuit 20h and the variable valve drive circuit 20j to advance the ignition timing and the intake valve closing timing (or increase the effective compression ratio) in order to avoid misfiring.

Figure 9:
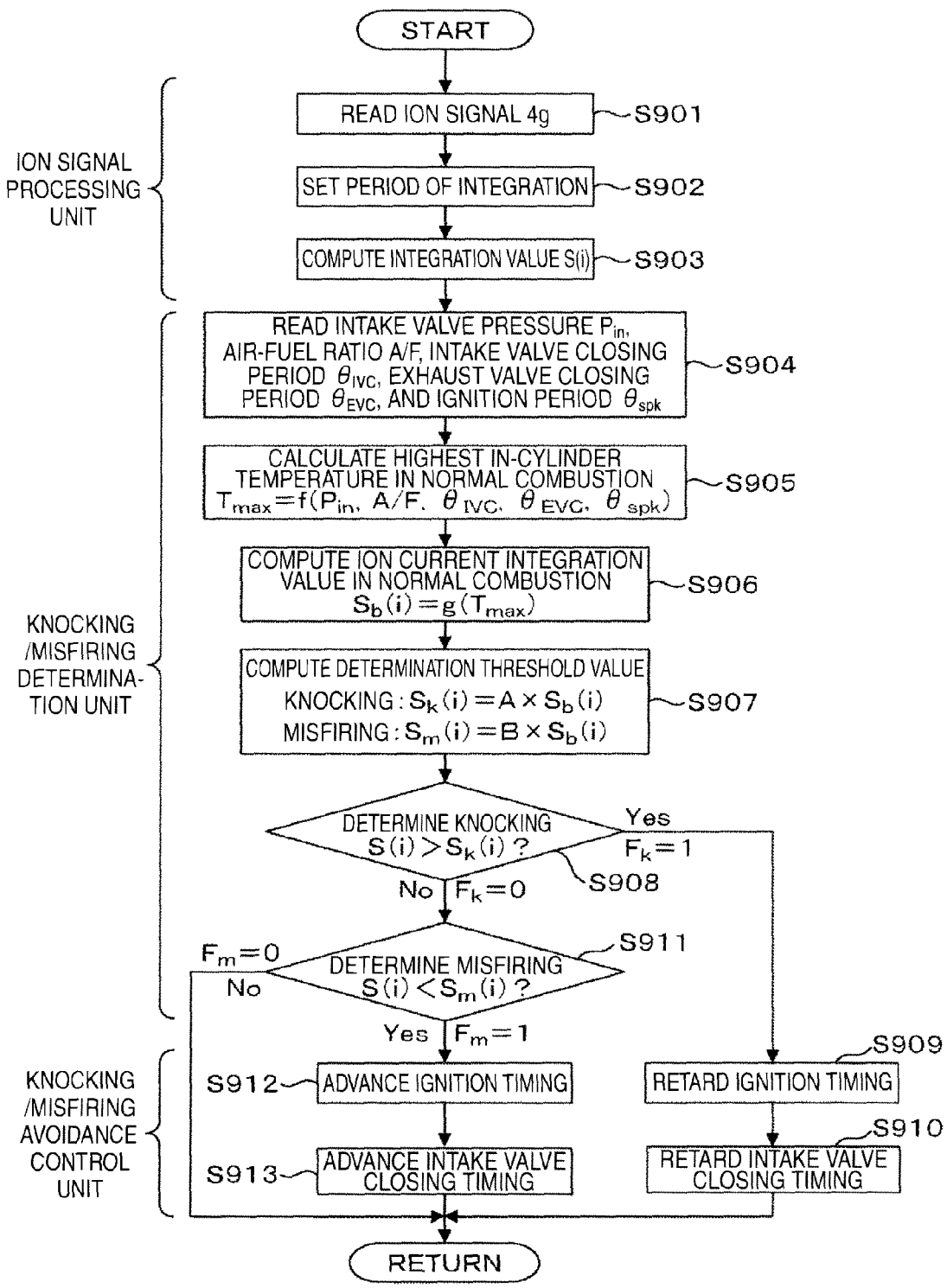
FIG. 9 A flowchart showing specifics of the abnormal-combustion determination and avoidance control based on the ion signals of the engine control device according to the first embodiment of the present invention.

FIG. 9 is a flowchart showing specifics of abnormal combustion determination and avoidance control based on the ion signal of the engine control device according to the first embodiment of the present invention. The ECU 20 repeatedly executes control specifics illustrated in FIG. 9 at a predetermined cycle.

In step S901, the ECU 20 reads the ion signal 4g. In step S902, a period for integrating an ion signal is set. Basically, a period from when a given time (e.g., 2 ms) elapses from the ignition timing until when combustion ends (e.g., 90 deg. ATDC) is set for an integration period. The integration period is previously stored as a map for each operating condition. Proceeding to step S903, where the ion signal integration value S(i) is computed. The symbol "i" designates an i-th cycle. Proceeding to step S904, where the intake pipe pressure $P_{in}$, the air-fuel ratio A/F, the intake valve closing timing $\theta_{IVC}$, the exhaust valve closing timing $\theta_{EVC}$, and the ignition timing $\theta_{spk}$ are read. In step S905, the maximum in-cylinder temperature $T_{max}$ in normal combustion is computed from the thus-read parameters. To be specific, the quantity of air in the cylinder and the amount of internal EGR are first determined from the exhaust valve closing timing and the intake pipe pressure. The history of in-cylinder temperatures in an air cycle of the compression-expansion stroke is determined from the effective compression ratio determined from the intake valve closing timing, the quantity of air in the cylinder, and the amount of internal EGR. The maximum in-cylinder temperature $T_{max}$ in normal combustion is calculated from the history of in-cylinder temperatures in the air cycle, the amount of heat generated during combustion that is determined from the air-fuel ratio, and the combustion completion timing which can be estimated from ignition timing. In step S906, the ion signal integration value $S_b(i)$ in normal combustion is computed from the maximum in-cylinder temperature $T_{max}$ in the normal combustion. Specifically, a formula (an approximate expression) derived from a relationship between the maximum in-cylinder temperature and the ion signal shown in FIG. 6 is stored in the ECU 20 in advance, and computation is performed by use of the formula.

In step S907, the knocking determination threshold value $S_k(i)$ and the misfiring determination threshold value $S_m(i)$ are computed from the ion signal integration value $S_b(i)$ in normal combustion. For instance, a product determined by multiplying the ion signal integration value $S_b(i)$ in normal combustion by a constant A is taken as the knocking determination threshold value $S_k(i)$. A product determined by multiplying the ion signal integration value $S_b(i)$ in normal combustion by a constant B is taken as the misfiring determination threshold value $S_m(i)$. The constant A is set to about 1.2 to 2.0, and the constant B is set to about 0.1 to 0.5.

In step S908, the ion signal integration value is compared with the knocking determination threshold value $S_k(i)$, thereby determining whether or not the current state corresponds to knocking. When $S(i)>S_k(i)$ stands, the current state is determined to correspond to knocking, and the processing proceeds to step S909. When $S(i) \leq S_k(i)$ stands, the current state is determined not to correspond to knocking, and the processing proceeds to step S911. In step S909, control for retarding the ignition timing is performed in order to avoid knocking. Further, in step S910, control for retarding the intake valve closing timing (reducing the effective compression ratio) is performed in order to avoid knocking, whereby the series of control operations is completed. When the current state is determined not to correspond to knocking in step S908, the processing proceeds to step S911, where determination is made as to whether or not the current state corresponds to misfiring by comparing the ion signal integration value S(i) with the misfiring determination threshold value $S_m(i)$. When $S(i) \geq S_m(i)$ stands, the current state is determined not to correspond to misfiring, and the series of control operations is completed. By contrast, when $S(i)<S_m(i)$ stands, the current state is determined to correspond to misfiring, and the processing proceeds to step S912. In step S912, control for advancing the ignition timing is performed in order to avoid misfiring. Further, in step S913, control for advancing the intake valve closing timing (increasing the effective compression ratio) is performed in order to avoid misfiring. Thus, the series of control operations is completed.

Figure 10:
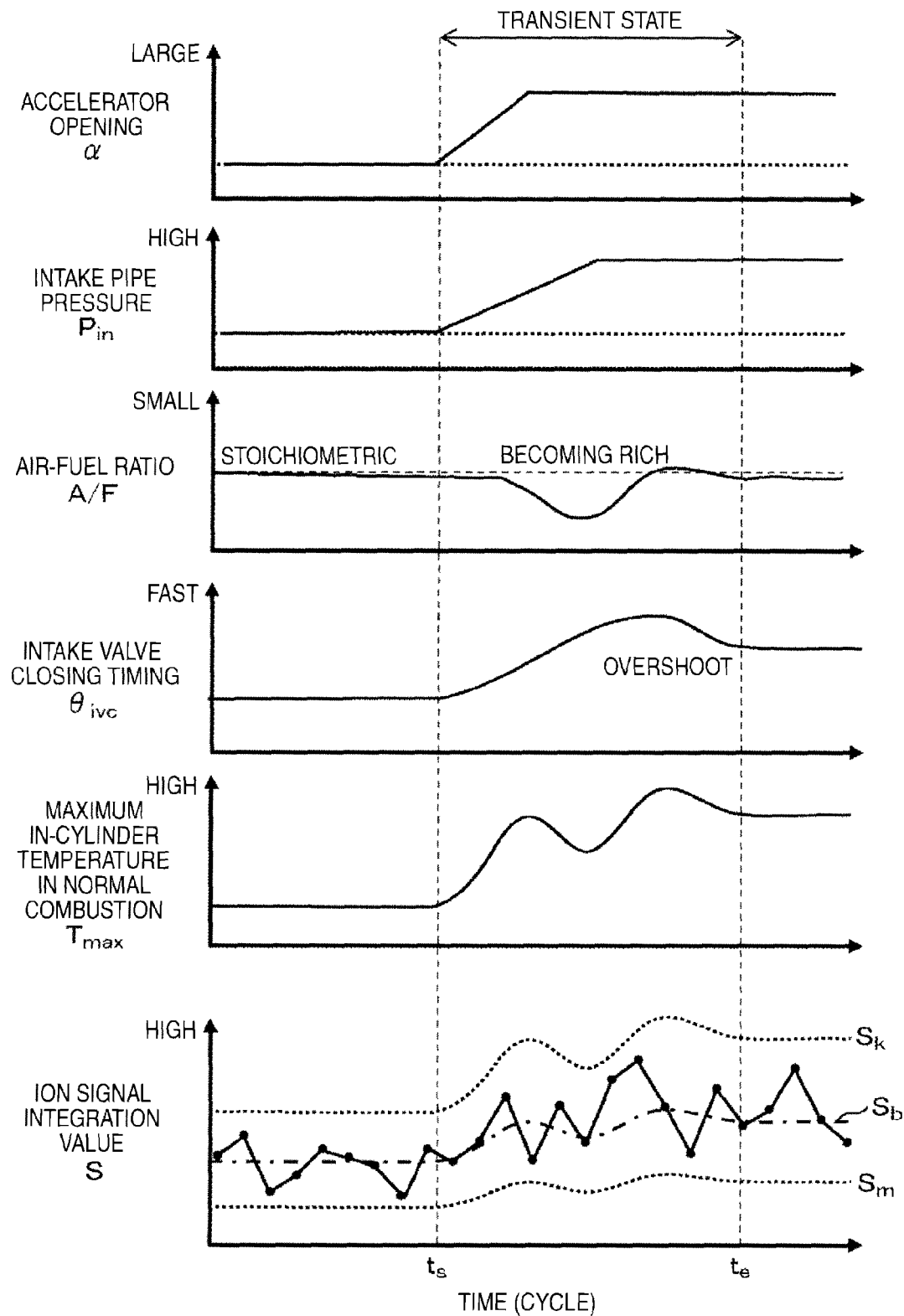
FIG. 10 A timing chart pertinent to the determination of abnormal combustion on the basis of the ion signals of the engine control device according to the first embodiment of the present invention.

FIG. 10 is a timing chart pertinent to the determination of abnormal combustion on the basis of the ion signal of the engine control device according to the first embodiment of the present invention. The drawing illustrates, in order from above, accelerator opening α, the make pipe pressure $P_{in}$, the air-fuel ratio A/F, the intake valve closing timing $\theta_{ivc}$, the maximum in-cylinder temperature in normal combustion (an estimated value) $T_{max}$, and variations in ion signal integration value S with time. A chart of the ion signal integration value S also includes the ion signal integration value $S_b$ in normal combustion, the knocking determination threshold value $S_k$, and the misfiring determination threshold value $S_m$. The embodiment is based on the presumption that the current state does not correspond to knocking, misfiring, or others. Operation with constant accelerator opening is performed before time $t_s$, and the operating state of the engine (the intake pipe pressure, the air-fuel ratio, etc.) and the estimated maximum in-cylinder temperature in normal combustion are stable. When the driver steps down the accelerator at time $t_s$, the throttle is opened in response to step-down action, whereupon the intake pipe pressure starts increasing. The intake pipe pressure increases at a given time lag after the opening of the accelerator. A fuel injection amount is controlled such that a desired air-fuel ratio (e.g., a theoretical mixture ratio) is achieved in agreement with the quantity of air in the cylinder. However, when the quantity of air in the cylinder is changing, the air-fuel ratio may become temporarily rich as illustrated in some cases. Further, the intake valve opening timing is controlled by the variable valve. There is a case where a change occurs in controllability for reasons of the aging of the variable valve or the like, which may cause an overshoot with respect to a target control value as illustrated. As a consequence, the interior of the engine cylinder enters a transient state from time $t_s$ to time $t_e$. In the embodiment, the maximum in-cylinder temperature in normal combustion in each cycle is computed from the parameters that undergo transient variations. Accordingly, an increase in in-cylinder temperature stemming from an increase in intake pipe pressure (an increase in quantity of air), a decrease in in-cylinder temperature resulting from the air-fuel ratio becoming rich, and a temperature increase resultant of an overshoot at the opening of the intake valve can be entirely effected on the maximum in-cylinder temperature.

The ion signal integration value $S_b$ in normal combustion is computed from the maximum in-cylinder temperature $T_{max}$ in normal combustion, and the knocking determination threshold value $S_k$ and the misfiring determination threshold value $S_m$ are subsequently computed. Since the measured ion signal integration value S falls within $S_k \geq S \geq S_m$ in the illustrated range, the current state is determined not to correspond to knocking/misfiring. According to the control, since the abnormal-combustion determination threshold values of the ion signal that follow the transient engine condition can be set, an erroneous determination of abnormal combustion, which would otherwise arise in the transient operating state, can be prevented.

A structure and operation of an engine control device according to a second embodiment of the present invention are hereunder described by reference to FIGS. 11 to 16.

Figure 11:
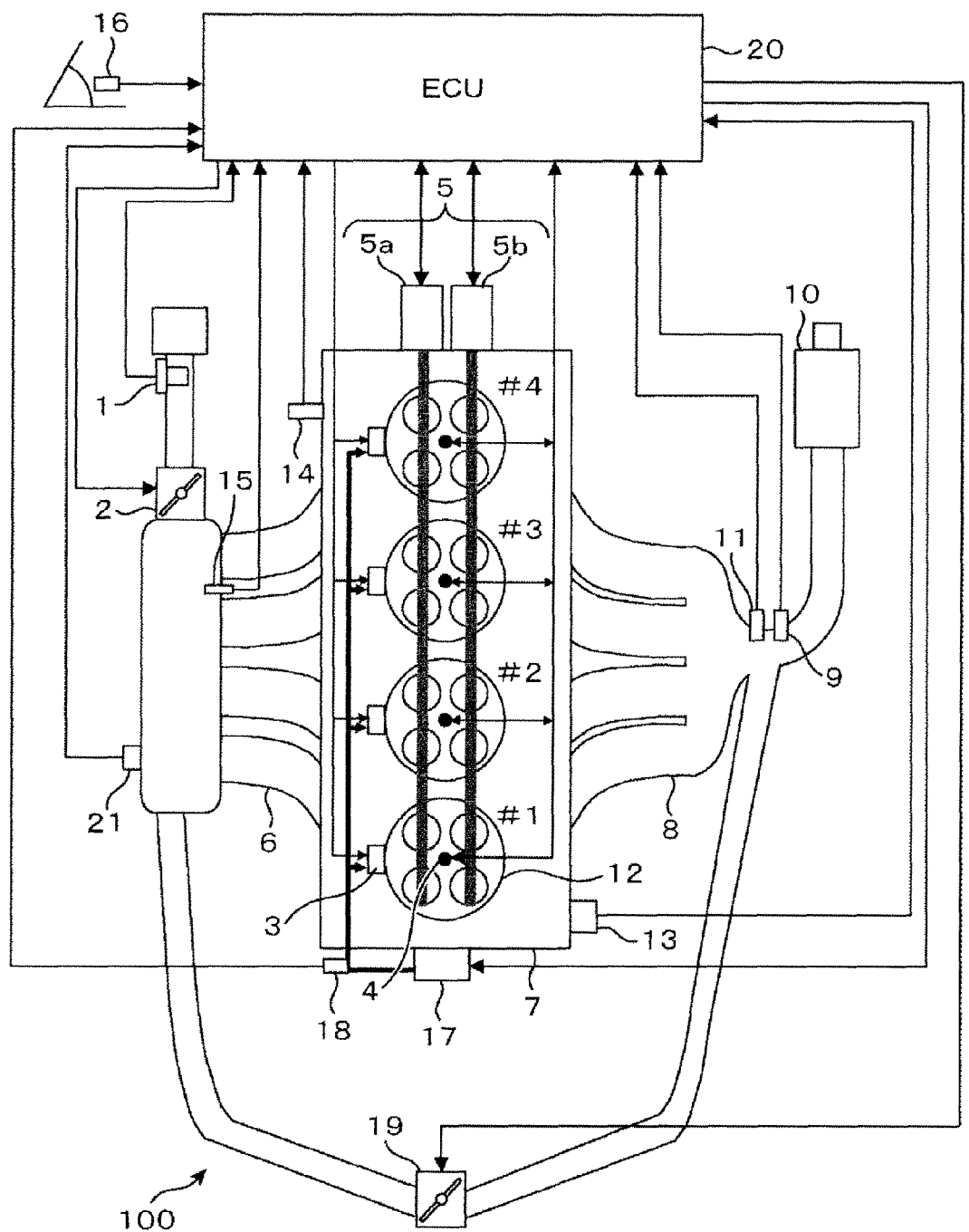
FIG. 11 A system configuration diagram of an engine control device according to a second embodiment of the present invention.

FIG. 11 is a system configuration diagram showing a configuration of a system in which an engine control device according to the second embodiment of the present invention is applied to an automobile in-cylinder injection-type gasoline engine. In addition to the system configuration according to the first embodiment illustrated in FIG. 1, the system is equipped with a bypass passage between the exhaust pipe and the intake pipe, and an EGR valve 19 placed at a position in the bypass passage for controlling a quantity of exhaust flowing into the intake pipe in the present embodiment.

Figure 12:
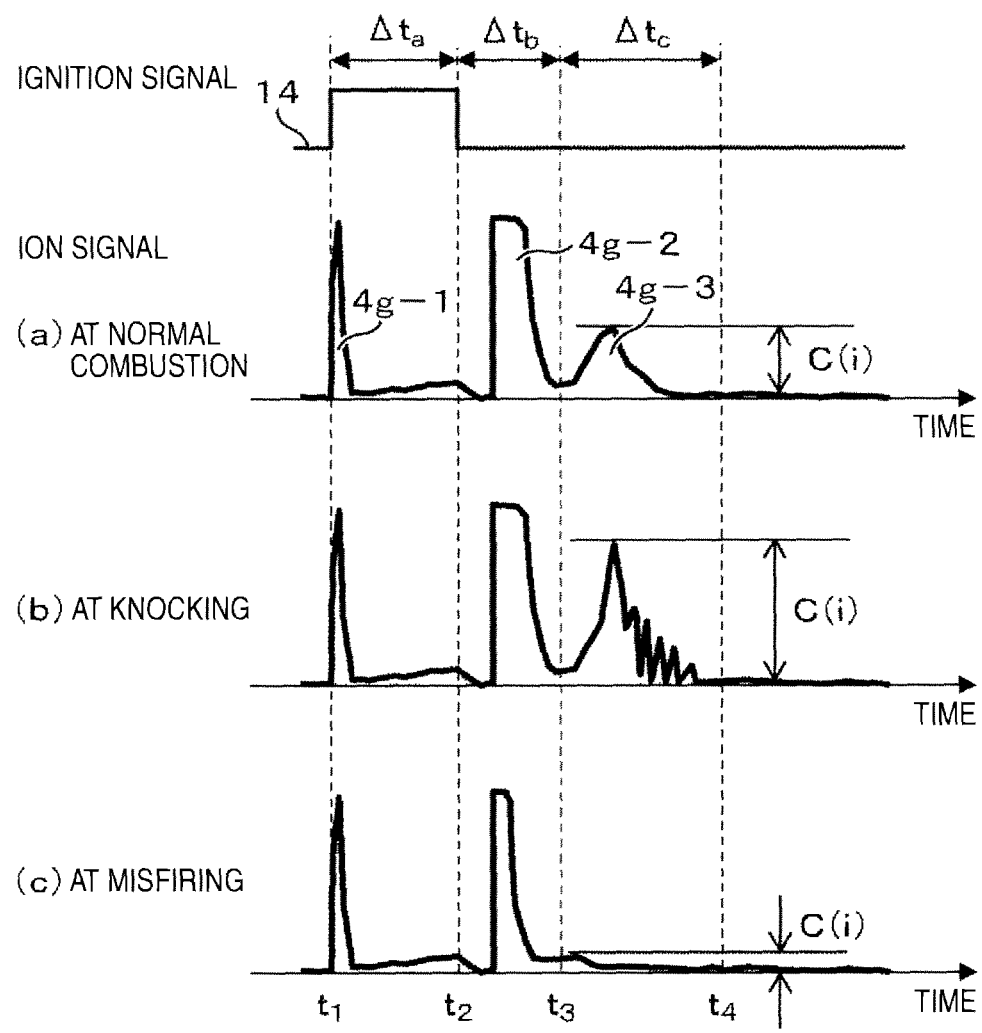
FIG. 12 A typical example of an ignition signal and ion signals of the engine control device according to the second embodiment of the present invention.
Figure 13:
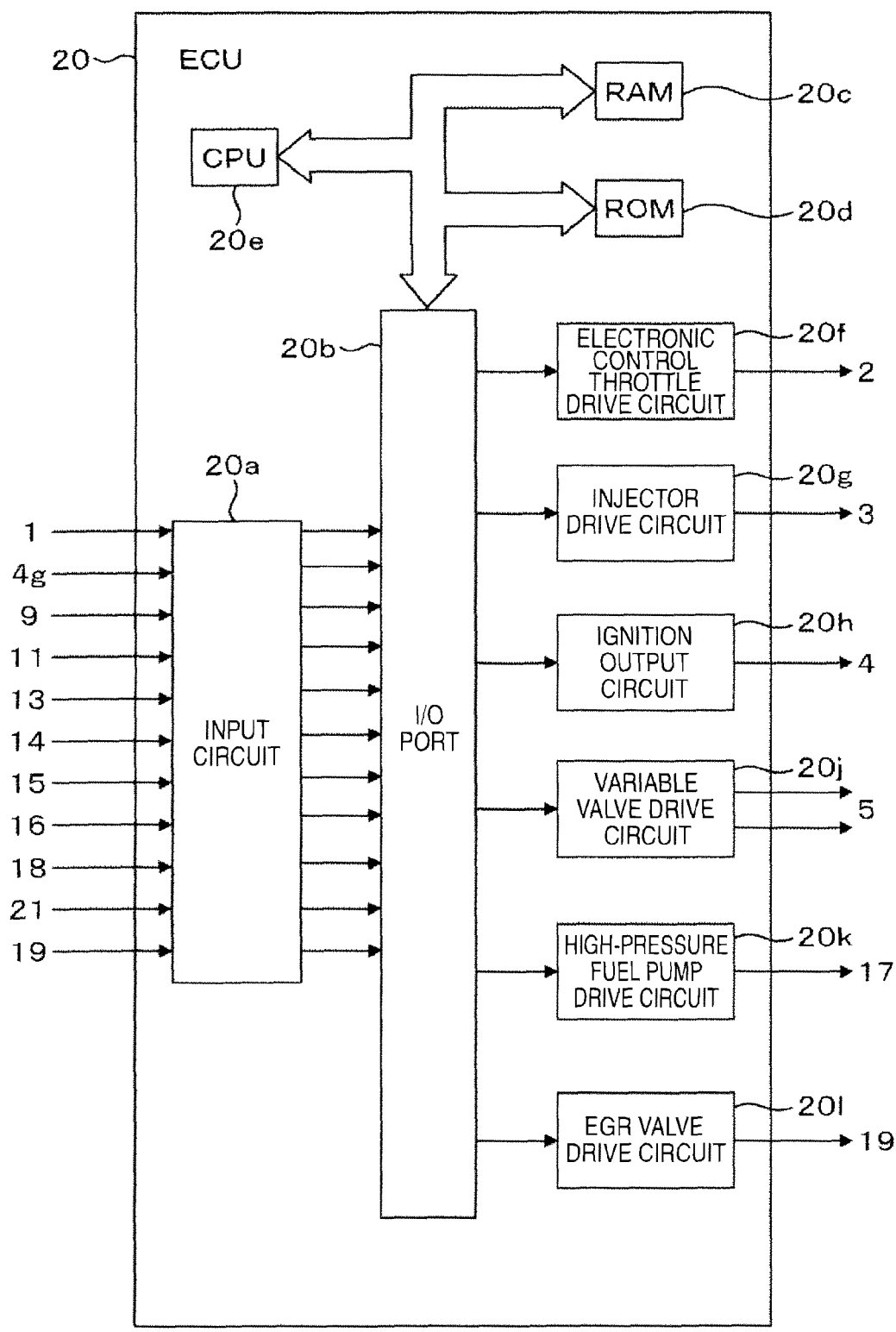
FIG. 13 A system block diagram showing a configuration of the engine control device according to the second embodiment of the present invention.

FIG. 12 is a typical example of an ignition signal and an ion signal of the engine control device according to the second embodiment of the present invention. The ion signals for normal combustion, knocking, and misfiring are as illustrated in FIG. 3. During knocking, knocking entails an increase in pressure/temperature in the combustion chamber, so that the signal of the third peak becomes greater, and a vibration component having the knocking frequency is superimposed on the signal. During misfiring, ion components are not generated in flames, and hence the signal of the third peak significantly decreases. In consideration of the characteristics above, a peak value of the third peak signal is utilized for determining the occurrence of abnormal combustion in the present embodiment. Specifically, the ignition signal 4h is shut off at time t2, and there is computed a peak value of the ion signal 4g from time t3 achieved after a lapse of Δtb since the signal was shut off until time t4 achieved after a lapse of Δtc. The thus-computed peak value is taken as C(i).

The principle of determination of knocking and misfiring using the ion signal of the present embodiment is analogous to that described by reference to FIGS. 4 to 6 (the essential requirement is to replace the ion signal integration value with an ion signal peak value).

FIG. 3 is a system block diagram showing a configuration of the engine control device according to the second embodiment of the present invention. In addition to the configuration of the engine control device according to the first embodiment of the present invention shown in FIG. 7, the engine control device of the present embodiment is characterized by additionally having opening of the EGR valve 19 as an input signal and an EGR valve drive circuit 20l.

Figure 14:
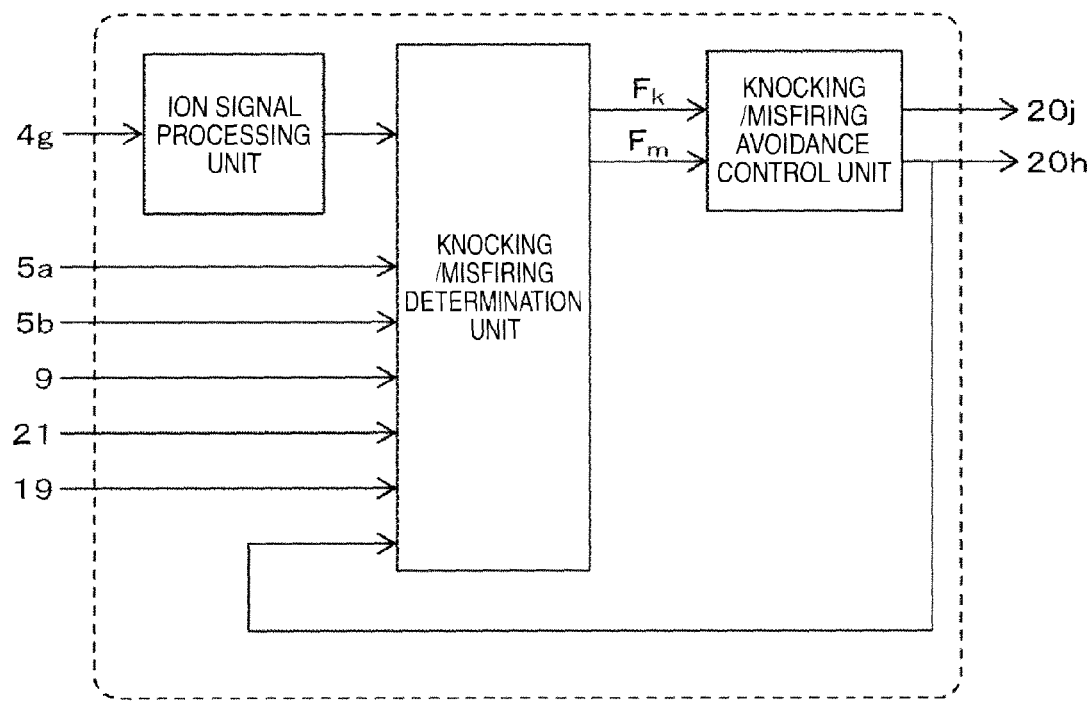
FIG. 14 A schematic diagram of abnormal-combustion determination and avoidance control logic implemented in an ECU of the engine control device according to the second embodiment of the present invention.

FIG. 14 is a drawing showing an outline of abnormal-combustion determination and avoidance-control logic implemented in the ECU 20 of the engine control device according to the second embodiment of the present invention. In addition to the configuration of abnormal-combustion determination and avoidance-control logic of the engine control device according to the first embodiment of the present invention, the configuration is characterized by having an EGR valve as an input signal in the knocking/misfiring determination unit. Details of computation performed in the ion signal processing unit differ from their counterparts described in connection with the first embodiment.

The ion signal 4g is input to the ion signal processing unit, and a peak value of the ion signal in a predetermined segment is output as illustrated in FIG. 12. In addition to the peak value of the ion signal, the current valve phase (particularly, the intake valve closing timing and exhaust valve closing timing), the air-fuel ratio, the intake pipe pressure, the ignition signal (ignition timing), and the EGR valve opening are input from the variable valve 5 to the knocking/misfiring determination unit. The maximum in-cylinder temperature in normal combustion is estimated from the intake valve closing timing, the exhaust valve closing timing, the air-fuel ratio, the intake pipe pressure, the ignition timing, and the EGR valve opening. Specifically, the quantity of air in the cylinder and the amount of internal EGR are determined from the exhaust valve closing timing, the intake pipe pressure, and the EGR valve opening. The history of in-cylinder temperatures in an air cycle of the compression-expansion stroke is determined from the effective compression ratio determined from the intake valve closing timing, the quantity of air in the cylinder, and the amount of internal EGR. The maximum in-cylinder temperature in normal combustion can be estimated from the history of in-cylinder temperatures in the air cycle, the amount of heat generated during combustion determined from the air-fuel ratio, and the combustion completion timing which can be estimated from ignition timing. The ion signal integration value in normal combustion is computed from the estimated maximum in-cylinder temperature in normal combustion by use of the relationship illustrated in FIG. 6. The knocking determination threshold value and the misfiring determination threshold value are computed by multiplying the ion signal integration value by the respective constants. The knocking determination threshold value and the misfiring determination threshold value are compared with the input ion integration value, thereby determining the occurrence of knocking and misfiring. When the current state is determined to correspond to knocking, the knocking determination flag $F_k$ is set to one. When the current state is determined to correspond to misfiring, the misfiring determination flag $F_m$ is set to one. The flags are output to the knocking/misfiring avoidance control unit.

The knocking/misfiring avoidance control unit is analogous to that described in connection with the first embodiment.

Figure 15:
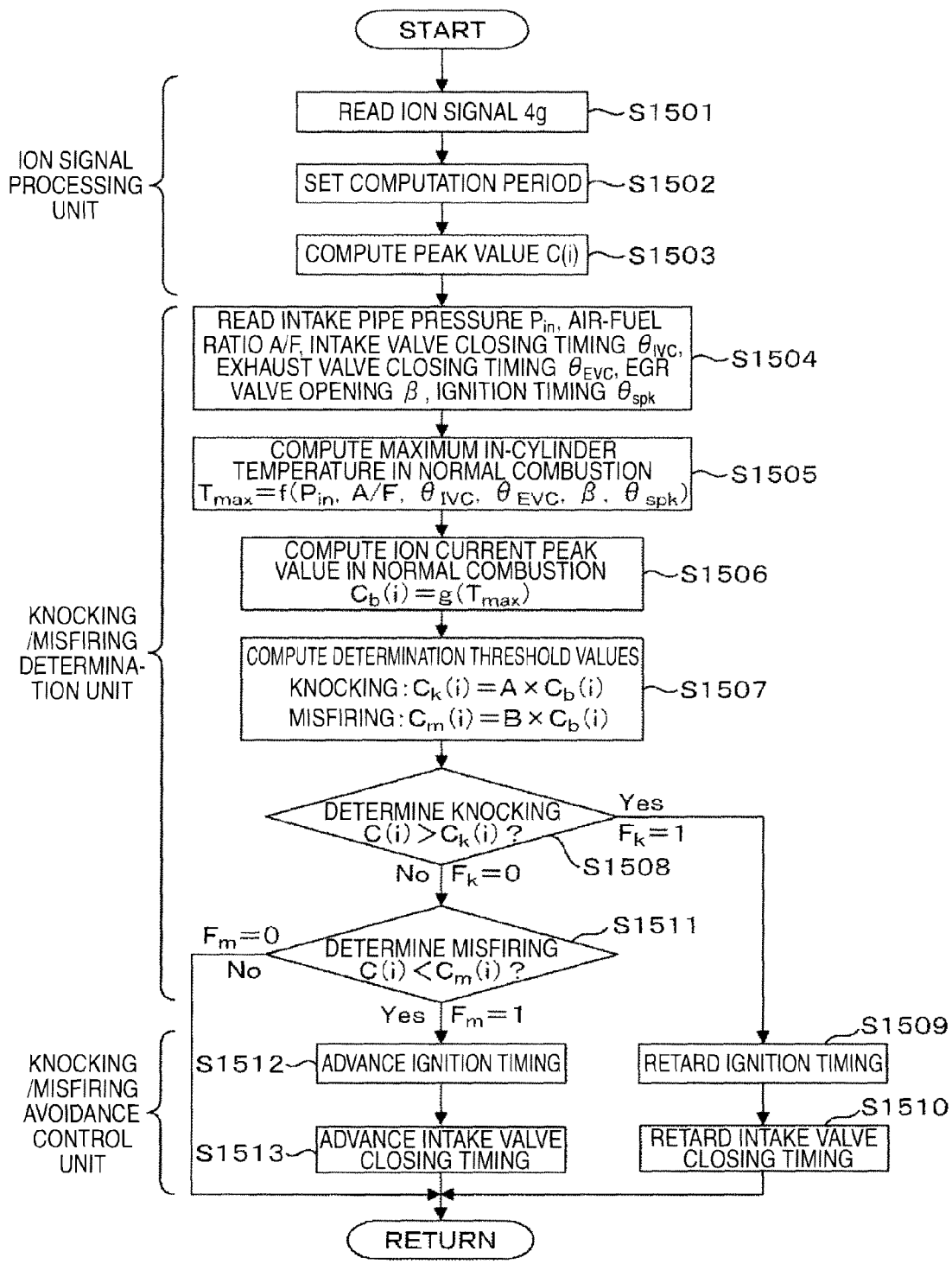
FIG. 15 A flowchart showing specifics of abnormal-combustion determination and avoidance control based on the ion signals of the engine control device according to the second embodiment of the present invention.

FIG. 15 is a flowchart showing specifics of abnormal-combustion determination and avoidance-control based on the ion signal of the engine control device according to the second embodiment of the present invention. The control specifics illustrated in FIG. 15 are repeatedly performed at a predetermined cycle by the ECU 20.

In step S1501, the ECU 20 reads the ion signal 4g. In step S1502, a period for computing an ion signal is set. Basically, a period from a time achieved after a given time (e.g., 2 ms) lapsed from the ignition timing until a time when combustion is completed (e.g., 90 deg. ATDC) is set to a computation period. The computation period is stored in advance as a map for each operation condition. Next, the processing proceeds to step S1503, where the ion signal peak value C(i) is computed. The symbol "i" designates the i-th cycle. The processing proceeds to step S1504, where the intake pipe pressure $P_{in}$, the air-fuel ratio A/F, the intake valve closing timing $\theta_{IVC}$, the exhaust valve closing timing $\theta_{EVC}$, the ignition timing $\theta_{spk}$, and an EGR valve opening β are read. In step S1505, the maximum in-cylinder temperature $T_{max}$ in normal combustion is computed from the thus-read parameters. Specifically, the quantity of air in the cylinder and the amount of internal EGR are first determined from the exhaust valve closing timing, the intake pipe pressure, and the EGR valve opening. The history of in-cylinder temperatures in an air cycle of the compression-expansion stroke is determined from the affective compression ratio determined from the intake valve closing timing, the quantity of air in the cylinder, and the amount of internal EGR. The maximum in-cylinder temperature $T_{max}$ in normal combustion is calculated from the history of in-cylinder temperatures in the air cycle, the amount of heat generated during combustion that is determined from the air-fuel ratio, and the combustion completion timing which can be estimated from the ignition timing. In step S1506, the ion signal peak value $C_b(i)$ in normal combustion is computed from the maximum in-cylinder temperature $T_{max}$ in the normal combustion. Specifically, the formula (an approximate expression) derived from the relationship between the maximum in-cylinder temperature and the ion signal shown in FIG. 6 is stored in the ECU 20 in advance, and computation is performed by use of the formula.

In step S1507, a knocking determination threshold value $C_k(i)$ and a misfiring determination threshold value $C_m(i)$ are computed from the ion signal peak value $C_b(i)$ in normal combustion. For instance, a product determined by multiplying the ion signal integration value $C_b(i)$ in normal combustion by the constant A is taken as the knocking determination threshold value $C_k(i)$. A product determined by multiplying the ion signal integration value $C_b(i)$ in normal combustion by the constant B is taken as the misfiring determination threshold value $C_m(i)$. The constant A is set to about 1.2 to 2.0, and the constant B is set to about 0.1 to 0.5.

In step S1508, the ion signal peak value C(i) is compared with the knocking determination threshold value $C_k(i)$, thereby determining whether or not the current state is determined to correspond to knocking. When $C(i)>C_k(i)$ stands, the current state is determined to correspond to knocking, and the processing proceeds to step S1509. When $C(i) \leq C_k(i)$ stands, the current state is determined not to correspond to knocking, and the processing proceeds to step S1511. In step S1509, control for retarding ignition timing is performed in order to avoid knocking. Further, in step S1510, control for the retarding the intake valve closing timing (reducing the effective compression ratio) is performed in order to avoid knocking, whereby the series of control operations is completed. When the current state is determined not to correspond to knocking in step S1508, the processing proceeds to step S1511, where determination is made as to whether or not the current state corresponds to misfiring by comparing the ion signal peak value C(i) with the misfiring determination threshold value $C_m(i)$. When $C(i) \geq C_m(i)$ stands, the current state is determined not correspond to misfiring, and the series of control operations is completed. By contrast, when $C(i)<C_m(i)$ stands, the current state is determined to correspond to misfiring, and the processing proceeds to step S1512. In step S1512, control for advancing the ignition timing is performed in order to avoid misfiring. Further, in step S1513, control for advancing the intake valve closing timing (increasing the effective compression ratio) is performed in order to avoid misfiring. Thus, the series of control operations is completed.

Figure 16:
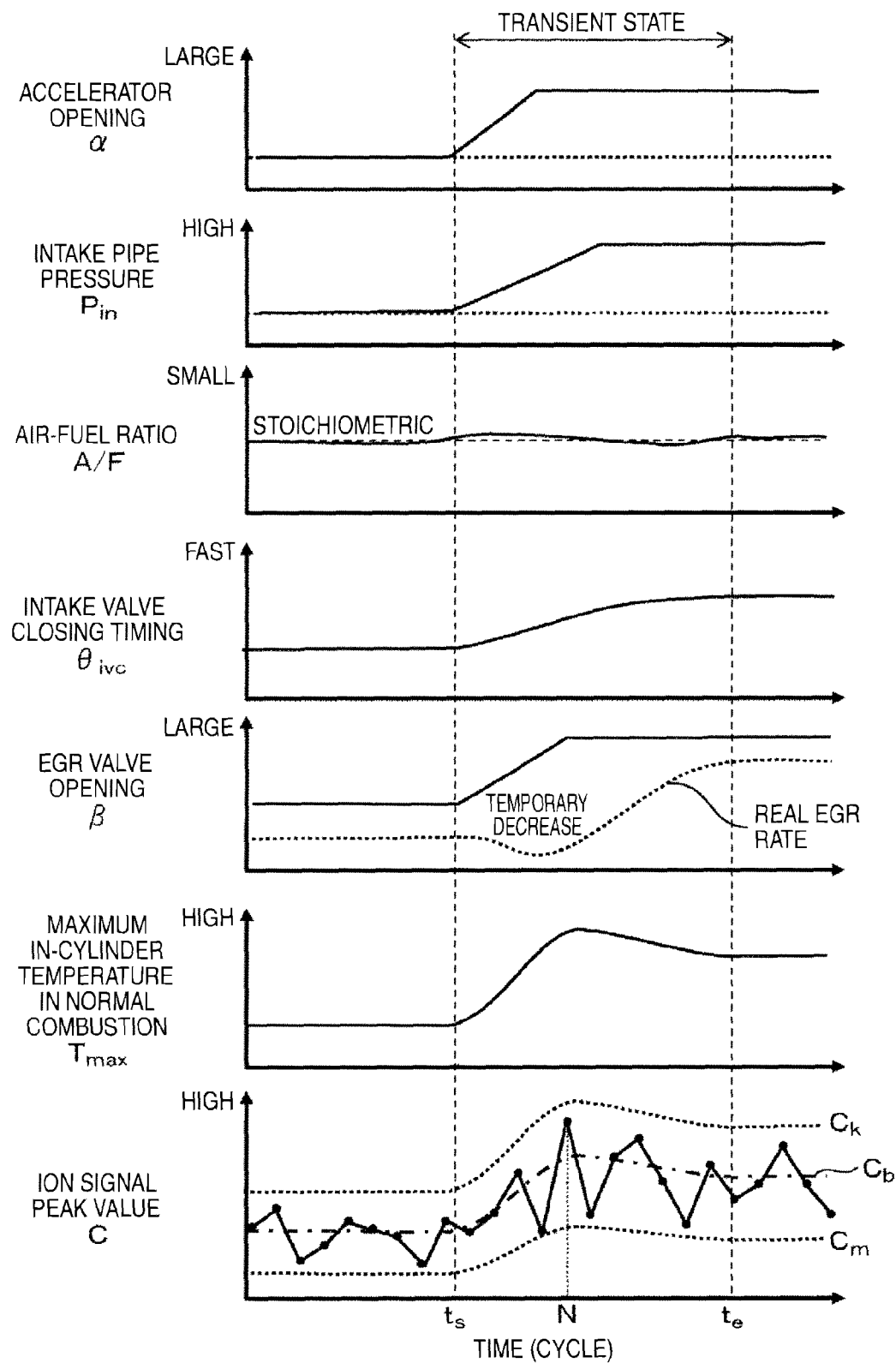
FIG. 16 A timing chart pertinent to the determination of abnormal combustion on the basis of the ion signals of the engine control device according to the second embodiment of the present invention.

FIG. 16 is a timing chart pertinent to the determination of abnormal combustion on the basis of the ion signal of the engine control device according to the second embodiment of the present invention. The drawing illustrates, in order from above, accelerator opening α, the intake pipe pressure $P_{in}$, the air-fuel ratio A/F, the intake valve closing timing $\theta_{ivc}$, the EGR valve opening β, the maximum in-cylinder temperature in normal combustion (an estimated value) $T_{max}$, and variations in ion signal peak value C with time. A chart of the ion signal peak value C also includes the ion signal integration value $C_b$ in normal combustion, the knocking determination threshold value $C_k$, and the misfiring determination threshold value $C_m$. The embodiment is based on the presumption that knocking, misfiring, or others, does not occur. Operation with constant accelerator opening is performed before time $t_s$, and operating state of the engine (the intake pipe pressure, the air-fuel ratio, etc.) and the estimated maximum in-cylinder temperature in normal combustion are stable. When the driver steps down the accelerator at time $t_s$, the throttle is opened in response to step-down action, whereupon the intake pipe pressure starts increasing. The intake pipe pressure and the intake valve closing timing increase at a given time lag after the opening of the accelerator. A fuel injection amount is controlled such that a desired air-fuel ratio (e.g., a theoretical mixture ratio) is achieved in agreement with the quantity of air in the cylinder. Although the EGR valve opening increases with a given time lag after the opening of the accelerator, a real EGR rate provided along with the EGR valve opening temporarily decreases before increasing. This is a phenomenon caused by a lag in the arrival of EGR that depends on the length of the intake bypass pipe, the exhaust bypass pipe and the like. As a consequence, the interior of the engine cylinder enters a transient state from the time $t_s$ to the time $t_e$. In the embodiment, the maximum in-cylinder temperature in normal combustion in each cycle is computed from the parameters that undergo transient variations. Accordingly a temperature increase resultant of a temporary decrease in EGR rate can be reflected on the maximum in-cylinder temperature.

The ion signal integration value $C_b$ in normal combustion is computed from the maximum-cylinder temperature $T_{max}$ in normal combustion, and the knocking determination threshold value $C_k$ and the misfiring determination threshold value $C_m$ are subsequently computed. Since the measured ion signal integration value C falls within $C_k \geq C \geq C_m$ in the illustrated period, the current state is determined not to correspond to knocking/misfiring. According to the control, the abnormal combustion determination threshold values of the ion signal that follow a transient change in engine condition; especially, the behavior of the EGR rate in the engine system having an external EGR, can be set, so that an erroneous determination of abnormal combustion, which would otherwise arise in the transient operating state, can be prevented.

A structure and operation of an engine control device according to a third embodiment of the present invention are hereunder described by reference to FIGS. 17 to 19.

A configuration of the system in which the engine control device of the third embodiment of the present invention is applied to an automobile in-cylinder injection-type gasoline engine is analogous to that illustrated in FIG. 11. A system block diagram showing a configuration of the engine control device according to the third embodiment of the present invention is analogous to FIG. 13. The principle of the determination of knocking and misfiring using the ion signal of the present embodiment is analogous to that described by reference to FIGS. 4 to 6 (the essential requirement is to replace the ion signal integration value with the ion signal peak value).

Figure 17:
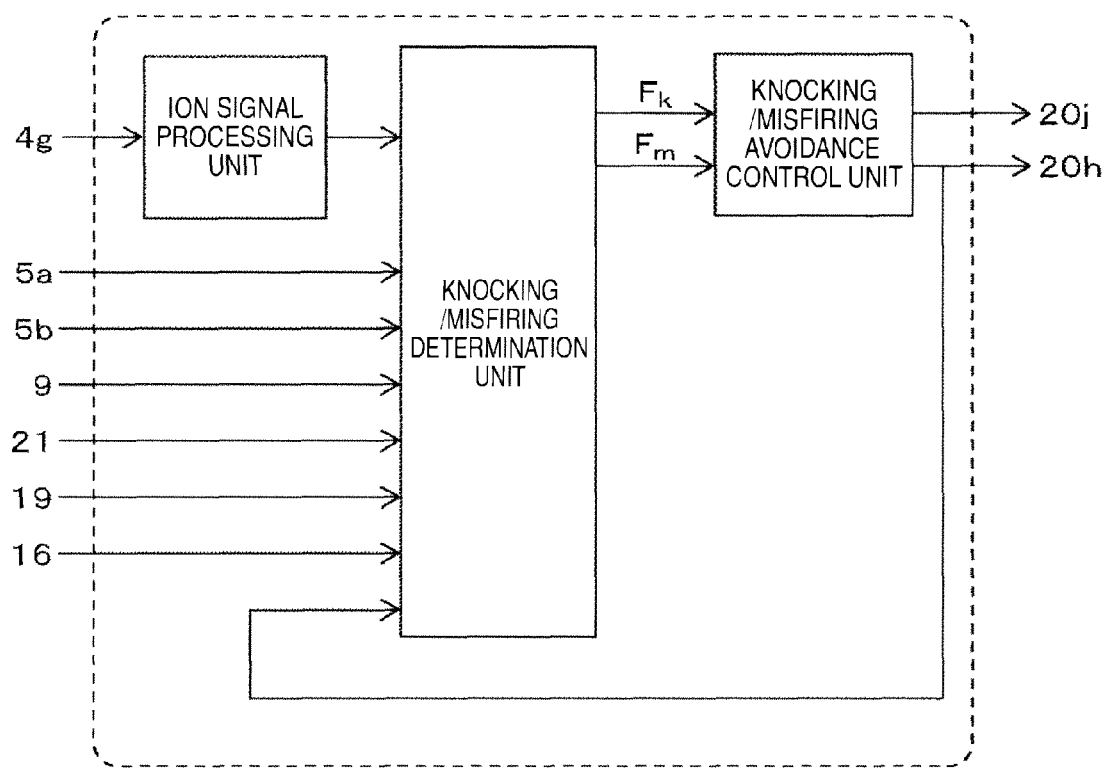
FIG. 17 A schematic diagram of abnormal-combustion-determination-and-avoidance-control logic implemented in an ECU of the engine control device according to a third embodiment of the present invention.

FIG. 17 is a drawing showing an outline of abnormal-combustion determination and avoidance-control logic implemented in the ECU 20 of the engine control device according to the third embodiment of the present invention. In addition to the configuration of the abnormal-combustion determination and avoidance-control logic of the engine control device according to the second embodiment of the present invention illustrated in FIG. 14, the logic also has the accelerator opening sensor 16 as an input signal in the knocking/misfiring determination unit. The knocking/misfiring determination unit determines whether or not the current operating condition is a steady condition on the basis of the accelerator opening sensor 16. On the basis of the result of the determination, a method for setting the knocking and misfiring determination threshold values is changed.

Figure 18:
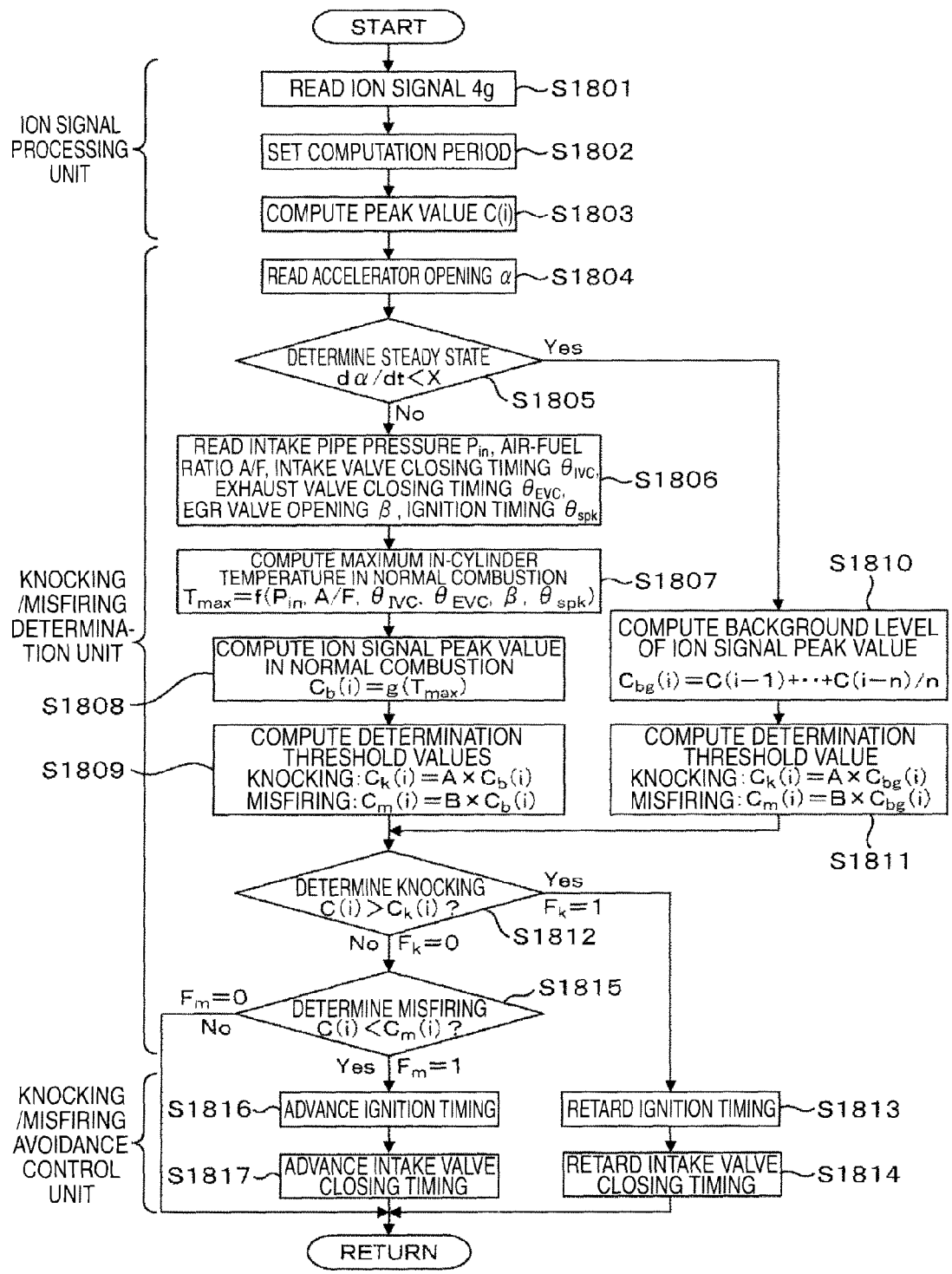
FIG. 18 A flowchart showing specifics of abnormal-combustion-determination-and-avoidance-control based on the ion signals of the engine control device according to the third embodiment of the present invention.

FIG. 18 is a flowchart showing specifics of abnormal-combustion determination and avoidance control based on the ion signal of the engine control device according to the third embodiment of the present invention. The control specifics illustrated in FIG. 18 are repeated at predetermined cycle by the ECU 20.

In step S1801, the ECU 20 reads the on signal 4g. In step S1802, a period for computing an ion signal is set. Basically, a period from a time achieved after a given time (e.g., 2 ms) lapsed from the ignition timing until a time when combustion is completed (e.g., 90 deg, ATDC) is set to a computation period. The computation period is stored in advance as a map for each operation condition. Next, the processing proceeds to step S1803, where the ion signal peak value C(i) is computed. The symbol "i" designates the i-th cycle. The processing proceeds to step S1804, where the accelerator opening α is read. Next, the processing proceeds to step S1805, where an amount of change in accelerator opening dα/dt is compared with a predetermined value X, determination is made as to whether or not the current state is a steady state. When dα/dt≥X stands; namely, when the current state is determined not to be a steady state, the processing proceeds to step S1806, where the intake pipe pressure $P_{in}$, the air-fuel ratio A/F, the intake valve closing timing $\theta_{IVC}$, the exhaust valve closing timing $\theta_{EVC}$, the ignition timing $\theta_{spk}$, and an EGR valve opening β are read. In step S1807, the maximum in-cylinder temperature $T_{max}$ in normal combustion is computed from the thus-read parameters. Specifically, the quantity of air in the cylinder and the amount of internal EGR are first determined from the exhaust valve closing timing, the intake pipe pressure, and the EGR valve opening. The history of in-cylinder temperatures in an air cycle of the compression-expansion stroke is determined from the effective compression ratio determined from the intake valve closing timing, the quantity of air in the cylinder, and the amount of internal EGR. The maximum in-cylinder temperature $T_{max}$ in normal combustion is calculated from the history of in-cylinder temperatures in the air cycle, the amount of heat generated during combustion that is determined from the air-fuel ratio, and the combustion completion timing which can be estimated from ignition timing. In step S1808, the ion signal peak value $C_b(i)$ in normal combustion is computed from the maximum in-cylinder temperature $T_{max}$ in the normal combustion. Specifically, the formula (an approximate expression) derived from the relationship between the maximum in-cylinder temperature and the ion signal shown in FIG. 6 is stored in the ECU 20 in advance, and computation is performed by use of the formula. In step S1809, the knocking determination threshold value $C_k(i)$ and the misfiring determination threshold value $C_m(i)$ are computed from the ion signal peak value $C_b(i)$ in normal combustion. For instance, a product determined by multiplying the ion signal integration value $C_b(i)$ in normal combustion by the constant A is taken as the knocking determination threshold value $C_k(i)$. A product determined by multiplying the ion signal integration value $C_b(i)$ in normal combustion by the constant B is taken as the misfiring determination threshold value $C_m(i)$. The constant A is set to about 1.2 to 2.0, and the constant B is set to about 0.1 to 0.5.

In step S1805, when dα/dt<X stands; namely, when the current state is determined to be a steady state, the processing proceeds to step S1810. In step S1810, a background level of the ion signal peak value is computed. The background level means an average of ion signal peak values for "n" cycles acquired prior to the current cycle. In steady-state conditions, the interior of the cylinder is stable, so that the background level, which is an average of ion signal peak values for "n" cycles in the past, can be considered to be an ion current peak value in normal combustion. The "n" is set to a value of about 5 to 30. In step S1811, the knocking determination threshold value $C_k(i)$ and the misfiring determination threshold value $C_m(i)$ are computed from a background level $C_{bg}(i)$. For instance, a product determined by multiplying the background level $C_{bg}(i)$ by the constant A is taken as the knocking determination threshold value $C_k(i)$. A product determined by multiplying the background level $C_{bg}(i)$ by the constant B is taken as the misfiring determination threshold value $C_m(i)$. Here, the constant A is set to about 1.2 to 2.0, and the constant B is set to about 0.1 to 0.5 too.

The knocking determination threshold value and the misfiring determination threshold value are set according to different methods respectively when the current state is the steady state and when the current state is not the steady state. Then in step S1812, the ion signal peak value C(i) is compared with the knocking determination threshold value $C_k(i)$, thereby determining whether or not the current state corresponds to knocking. When $C(i) > C_k(i)$ stands, the current state is determined to correspond to knocking, and the processing proceeds to step S1813. When $C(i) \leq C_k(i)$ stands, the current state is determined not to correspond to knocking, and the processing proceeds to step S1815. In step S1813, control for retarding ignition timing is performed in order to avoid knocking. Further, in step S1814, control for retarding the intake valve closing timing (reducing the effective compression ratio) is performed in order to avoid knocking, whereby the series of control operations is completed. When the current state is determined not to correspond to knocking in step S1812, processing proceeds to step S1815, where determination is made as to whether or not the current state corresponds to misfiring by comparing the ion signal peak value C(i) with the misfiring determination threshold value $C_m(i)$. When $C(i) \geq C_m(i)$ stands, the current state is determined not to correspond to misfiring, and the series of control operations is completed. By contrast, when $C(i) < C_m(i)$ stands, the current state is determined to correspond to misfiring, and the processing proceeds to step S1816. In step S1816, control for advancing the ignition timing is performed in order to avoid misfiring. Further, in step S1817, control for advancing the intake valve closing timing (increasing the effective compression ratio) is performed in order to avoid misfiring. Thus, the series of control operations is completed.

Figure 19:
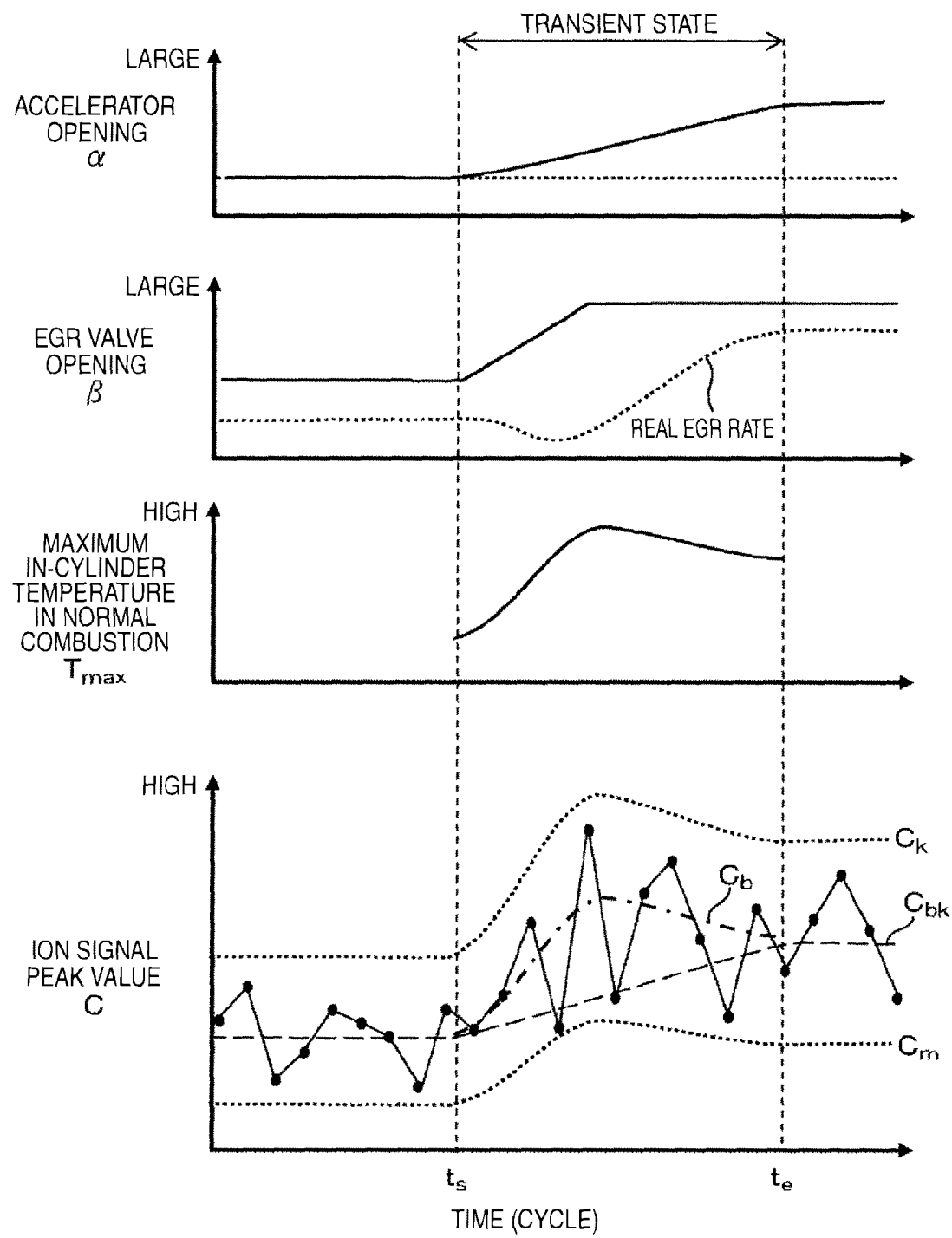
FIG. 19 A timing chart pertinent to the determination of abnormal combustion on the basis of the ion signals of the engine control device according to the third embodiment of the present invention.

FIG. 19 a timing chart pertinent to the determination of abnormal combustion on the basis of the ion signal of the engine control device according to the third embodiment of the present invention. The drawing illustrates, in order from above, accelerator opening α, EGR valve opening β, the maximum in-cylinder temperature in normal combustion (an estimated value) $T_{max}$, and variations in ion signal peak value C with time. A chart of the ion signal peak value C also includes the ion signal integration value $C_b$ in normal combustion, the background level $C_{bk}$, the knocking determination threshold value $C_k$, and the misfiring determination threshold value $C_m$. The embodiment is based on the presumption that the current state does not correspond to knocking, misfiring, or others. Operation with constant accelerator opening is performed before time $t_s$, and the ECU 20 determines that the current state is a steady state. Therefore, the knocking determination threshold value $C_k$ and the misfiring determination threshold value $C_m$ are calculated from the background level $C_{bk}$ of the ion signal. When the driver presses down on the accelerator at the time $t_s$, the ECU 20 determines that the current state is not the steady state; in other words, the current state is a transient state. Accordingly, the knocking determination threshold value $C_k$ and the misfiring determination threshold value $C_m$ are calculated from the ion peak value $C_b$ in normal combustion. The ion peak value $C_b$ in normal combustion is determined from the maximum in-cylinder temperature in normal combustion based on the EGR valve opening, etc. In the illustrated range, the measured ion signal integration value S fails within $S_k \geq S \geq S_m$, the current state is determined not to correspond to knocking or misfiring.

In the embodiment, in the steady state in which the interior state of the cylinder is stable, the knocking determination threshold value and the misfiring determination threshold value are calculated from the background level. In the transient state where a significant change occurs in the interior state of the cylinder, the knocking determination threshold value and the misfiring determination threshold value are calculated from the ion signal in normal combustion based on the estimated in-cylinder temperature. This makes it possible to prevent the occurrence of an erroneous determination of abnormal combustion while minimizing an increase in load on computation of the ECU 20 entailed by the estimation of the in-cylinder temperature.

The above shows examples which use only the amount of change in accelerator opening with time as the parameter for determining a steady state. However, the parameter is not limited to this. The amounts of changes in the intake pipe pressure and the intake valve closing timing with time can also be used. Alternatively, a given period (e.g., 100 ms) from when a change has occurred in accelerator opening can also be determined to be a transient state.

REFERENCE SIGNS LIST

1 AIR-FLOW SENSOR
2 ELECTRONIC CONTROL THROTTLE
3 INJECTOR
4 IGNITION SYSTEM
4a SPARK PLUG
4b SECONDARY IGNITION COIL
4c PRIMARY IGNITION COIL
4d CAPACITOR
4e ZENER DIODE
4f VOLTAGE CONVERSION RESISTOR
4g ION SIGNAL
4h IGNITION SIGNAL
4i IGNITER
5 VARIABLE VALVE
5a VARIABLE INTAKE VALVE
5b VARIABLE EXHAUST VALVE
6 INTAKE PIPE
7 CYLINDER HEAD
8 EXHAUST PIPE
9 AIR-FUEL RATIO SENSOR
10 THREE-WAY CATALYST
11 EXHAUST TEMPERATURE SENSOR
12 COMBUSTION CHAMBER
13 CRANK ANGLE SENSOR
14 COOLANT TEMPERATURE SENSOR
15 INTAKE TEMPERATURE SENSOR
16 ACCELERATOR OPENING SENSOR
17 HIGH-PRESSURE FUEL PUMP

18 FUEL PRESSURE SENSOR
19 EGR VALVE
20 ECU
20a INPUT CIRCUIT
20b I/O PORT
20c RAM
20d ROM
20e CPU
20f ELECTRONIC CONTROL THROTTLE DRIVE CIRCUIT
20g INJECTOR DRIVE CIRCUIT
20h IGNITION OUTPUT CIRCUIT
20j VARIABLE VALVE DRIVE CIRCUIT
20k HIGH-PRESSURE FUEL PUMP DRIVE CIRCUIT
20l EGR VALVE DRIVE CIRCUIT
21 INTAKE PRESSURE SENSOR
100 ENGINE

The invention claimed is:

1. An engine control device, comprising:
an ion detector configured to detect ions generated during combustion in an engine and to output an ion signal indicative of the detection;
an in-cylinder temperature estimator configured to estimate an in-cylinder temperature in a normal combustion cycle under current operating conditions of an engine; and
an abnormal combustion determiner configured to:
set a knocking determination threshold value or a misfiring determination threshold value on the basis of the estimated in-cylinder temperature; and
determine an occurrence of knocking or misfiring based on comparing an integration of the ion signal or a peak value of the ion signal, acquired in a predetermined period of the combustion cycle, to the knocking determination threshold or the misfiring determination threshold.

2. The engine control device according to claim 1, further comprising a normal-combustion ion signal analyzer configured to compute a normal-combustion ion signal value based on the in-cylinder temperature estimated by the in-cylinder temperature estimator, wherein the knocking determination threshold value or the misfiring determination threshold value is set by the abnormal combustion determiner on the basis of the computed normal-combustion ion signal value.

3. The engine control device according to claim 1, wherein the in-cylinder temperature estimator is configured to estimate the in-cylinder temperature based on at least one of internal pressure of an intake pipe of the engine, opening-closing timings of an intake valve and an exhaust valve that control air intake and air exhaust of the engine, an air-fuel ratio that is a mass ratio of air to fuel fed to an interior of a combustion chamber of the engine, and an ignition signal for controlling ignition timing of the engine.

4. The engine control device according to claim 3, further comprising an EGR (Exhaust Gas Recirculation) pipe for re-circulating an air exhaust provided between the intake pipe and the exhaust pipe, and an EGR valve for controlling an amount of air exhaust to be re-circulated provided in the EGR pipe, wherein in-cylinder temperature estimator is configured to estimate the in-cylinder temperature based on an opening of the EGR valve.

5. The engine control device according to claim 1, wherein the in-cylinder temperature is a maximum in-cylinder temperature in the normal combustion cycle.

6. The engine control device according to claim 1, wherein the engine control device is configured to change at least one of ignition timing of the engine and closing timing of the intake valve when the abnormal combustion determiner determines that knocking or misfiring has occurred.

7. The engine control device according to claim 1, further comprising a steady state operation determiner configured to determine whether or not a current operation state of the engine is a steady operation state, wherein, when the steady state operation determiner determines that the current operation state of the engine is not a steady operation state, the abnormal combustion determiner sets the knocking determination threshold value or the misfiring determination threshold value on the basis of the in-cylinder temperature information.

8. The engine control device according to claim 7, wherein, when the steady state operation determiner determines that the current state is the steady operation state, the abnormal combustion determiner sets the knocking determination threshold value or the misfiring determination threshold value on the basis of an average of ion signals for a predetermined number of cycles prior to a current cycle detected by the ion signal detector.

9. An engine control device comprising:
an ion signal detector configured to detect ions generated during combustion and to output an ion signal indicative of the detection;
an abnormal combustion determiner configured to determine an occurrence of knocking or misfiring based on the ion signal; and
an abnormal combustion determiner configured to:
set a knocking determination threshold value or a misfiring determination threshold value on the basis of at least one of opening-closing timings of an intake valve and an exhaust valve for controlling air intake and air exhaust of an engine, an air-fuel ratio that is a mass ratio of air to fuel fed to an interior of a combustion chamber, and an opening of an EGR valve for controlling an amount of air exhaust to be re-circulated; and
determine an occurrence of knocking or misfiring based on comparing an integration of the ion signal or a peak value of the ion signal, acquired in a predetermined period of the combustion cycle, to the knocking determination threshold or the misfiring determination threshold.

* * * * *